United States Patent
Metcalfe et al.

(10) Patent No.: US 12,176,714 B2
(45) Date of Patent: Dec. 24, 2024

(54) MOVING AND STORING ENERGY BETWEEN UTILITY'S ENERGY DELIVERY NETWORKS

(71) Applicant: Power Management Holdings (U.S.), Inc., Waukesha, WI (US)

(72) Inventors: Malcolm Stuart Metcalfe, North Vancouver (CA); John Todd Sankey, Vancouver (CA)

(73) Assignee: Power Management Holdings (U.S.), Inc., Waukesha, WI (US)

( * ) Notice: Subject to any disclaimer, the term of this patent is extended or adjusted under 35 U.S.C. 154(b) by 0 days.

(21) Appl. No.: 16/818,126

(22) Filed: Mar. 13, 2020

(65) Prior Publication Data

US 2020/0295564 A1    Sep. 17, 2020

Related U.S. Application Data

(60) Provisional application No. 62/819,404, filed on Mar. 15, 2019.

(51) Int. Cl.
*H02J 3/32* (2006.01)
*H02J 3/00* (2006.01)
(Continued)

(52) U.S. Cl.
CPC .......... *H02J 3/008* (2013.01); *H02J 3/32* (2013.01); *H02J 5/00* (2013.01); *H02J 15/003* (2013.01);
(Continued)

(58) Field of Classification Search
CPC ...... H02J 3/008; H02J 3/32; H02J 5/00; H02J 15/003; H02J 2300/26; H02J 2300/40
(Continued)

(56) References Cited

U.S. PATENT DOCUMENTS

| 9,762,087 B2 | 9/2017 | Metcalfe et al. |
| 10,044,188 B2 | 8/2018 | Metcalfe |

(Continued)

FOREIGN PATENT DOCUMENTS

| CA | 2931266 A1 | 5/2015 |
| CA | 2984385 A1 | 11/2016 |

(Continued)

OTHER PUBLICATIONS

YouTube Video: "The Hydrogen Electrolyser"; Mar. 23, 2015; https://www.youtube.com/watch?v=WfkNf7KMZPA.*

(Continued)

*Primary Examiner* — Daniel Kessie
*Assistant Examiner* — Dru Parries
(74) *Attorney, Agent, or Firm* — Merchant & Gould P.C.

(57) ABSTRACT

A first energy converter that can consume a first physical energy form of a first energy delivery network can be controlled to produce a second physical energy form of a second energy delivery network and inject the second physical energy form into the second energy delivery network. A second energy converter that can consume the second physical energy form of the second energy delivery system can be controlled to produce the first physical energy form of the first energy delivery network and inject the first physical energy form into the first energy deliver network. The controlling of the first energy converter and the controlling of the second energy converter can be coordinated. Related apparatus, systems, techniques and articles are also described.

20 Claims, 4 Drawing Sheets

(51) Int. Cl.
*H02J 5/00* (2016.01)
*H02J 15/00* (2006.01)

(52) U.S. Cl.
CPC ....... *H02J 2300/26* (2020.01); *H02J 2300/40* (2020.01)

(58) Field of Classification Search
USPC .......................................................... 307/46
See application file for complete search history.

(56) References Cited

U.S. PATENT DOCUMENTS

| | | |
|---|---|---|
| 2011/0178643 A1 | 7/2011 | Metcalfe |
| 2013/0030597 A1 | 1/2013 | Milosevic et al. |
| 2013/0193951 A1 | 8/2013 | Korovin |
| 2014/0375472 A1 | 12/2014 | Sankey |
| 2015/0280435 A1 | 10/2015 | Metcalfe et al. |
| 2016/0099607 A1* | 4/2016 | Landis ............... H02J 3/30 307/46 |
| 2016/0285266 A1 | 9/2016 | Rudlinger |
| 2016/0313197 A1 | 10/2016 | Acharya |
| 2018/0131188 A1 | 5/2018 | Metcalfe |
| 2018/0131270 A1* | 5/2018 | Morel ............... H02M 1/4258 |
| 2020/0067314 A1 | 2/2020 | Metcalfe et al. |
| 2021/0083477 A1 | 3/2021 | Metcalfe et al. |

FOREIGN PATENT DOCUMENTS

| | | | |
|---|---|---|---|
| CA | 2786720 C | 9/2018 | |
| CN | 104 300 552 A | 1/2015 | |
| CN | 106 655 207 A | 5/2017 | |
| EP | 2788832 B1 | 10/2014 | |
| JP | 2011182516 A | 9/2011 | |
| WO | WO 2011/085477 A1 | 1/2011 | |
| WO | WO 2013/086238 A1 | 6/2013 | |
| WO | WO-2014078659 A2 * | 5/2014 | ............ F01K 13/00 |
| WO | WO 2016/176775 A1 | 11/2016 | |

OTHER PUBLICATIONS

Cagano et al., "Centralized voltage control for distribution networks with embedded PV systems," *Renewable Energy*, vol. 76, pp. 176-185, Nov. 26, 2014.

Extended European Search Report and Opinion issued in European Patent Application No. 18814399.4, issued on Feb. 12, 2021, 8 pages.

International Search Report and Written Opinion of the International Searching Authority, mailed Jul. 17, 2018, for corresponding International Application No. PCT/CA2018/050670, 8 pages.

International Search Report and Written Opinion for International Application No. PCT/US2019/056000, mailed on Dec. 10, 2019, 14 pages.

Mahmud et al., "Review of control strategies for voltage regulation of the smart distribution network with high penetration of renewable distributed generation," *Renewable and Sustainable Energy Reviews*, vol. 64, pp. 582-595, Jul. 8, 2016.

Schweitzer et al., "Real-Time Power System Control Using Synchrophasors," 2008 $61^{st}$ Annual conference for Protective Relay Engineers, College Station, Texas, 2008, pp. 78-88.

Schweitzer et al., "Synchrophasor-based power system protection and control applications," 2010 63rd Annual conference for Protective Relay Engineers, College Station, Texas, 2010, pp. 1-10.

International Search Report and Written Opinion issued in International Publication No. PCT/IB2020/052326, mailed on May 29, 2020, 13 pages.

European Patent Office; European Search Report for Application No. 20772812.2 mailed Feb. 21, 2023, 10 pages.

Walker, Sean B. et al; Economic analysis with respect to Power-to-Gas energy storage with consideration of various market mechanisms; International Journal of Hydrogen Energy, Elsevier, Amsterdam, NL, vol. 41, No. 19, Mar. 28, 2016, pp. 7754-7765.

European Patent Office; European Supplementary Search Report for Application No. 20772812.2 mailed Mar. 3, 2023, 1 page.

* cited by examiner

MOVING AND STORING ENERGY BETWEEN UTILITY'S ENERGY DELIVERY NETWORKS

CROSS REFERENCE TO RELATED APPLICATION

This application claims priority under 35 U.S.C. § 119(e) to U.S. Patent Application No. 62/819,404 filed Mar. 15, 2019, the entire contents of which is hereby incorporated by reference herein.

FIELD

The subject matter described herein relates to storing and moving bulk energy of utilities.

BACKGROUND

As society attempts to decarbonize the energy infrastructure, it faces several big challenges. First, most energy today is still delivered as fossil fuel. As of 2018, 37% of U.S. energy was delivered as petroleum, 31% as natural gas, 13% as coal, and 5% as biomass. Only 15% came from renewable sources. To decarbonize the energy system, society needs to greatly increase the use of renewable sources of energy. The second challenge is the means of energy delivery. Of the delivered energy, only 38% was delivered through an electric grid, and the total delivered energy through the electric grid is declining, not increasing, as a result of various market dynamics. Almost all renewable resources deliver their energy through electricity so to use more renewables, society must make much greater use of its electric grids. To increase the use of electric grids to deliver much greater quantities of energy, the control strategies applied to electric grids must change. The current state of the art for managing an electric grid is to have enough spare capacity to survive a failure in the largest generation source at the worst peak demand time. This makes an electric grid very stable, but it also means that most of the year, the electric grid is drastically underutilized. Often an electric grid is delivering energy at less than half of its peak power capacity, sometimes much less than half. If this control strategy continues, then greatly increasing the energy delivered of the electric grid to support much greater use of renewable sources will require more than tripling installed infrastructure (such as transmission lines, substations, and distribution lines). The capital cost and timing would be challenging, not to mention the consequent very large carbon footprint due to the manufacturing. Keeping stability while greatly increasing utilization, and hence delivered energy, can be done without increasing the installed infrastructure if the electric grid has access to very large amounts of short, medium, and long term energy storage to buffer the variability in power requirements and supplies. Electric grids have no inherent or intrinsic storage capability, so storage must be "added". The amount of conventional storage needed to achieve even partially systemic stability is massively beyond the scope of anything currently envisioned. For example, if these storage needs were to be met with state-of-the-art lithium ion batteries, the cost might reach trillions of dollars after speculatively assuming the sufficiency of constituent rare earth metals. The present inventions address the energy storage challenge by "adding storage" through use of another energy system, for example a natural gas pipeline.

SUMMARY

In an aspect, a first energy converter that can consume a first physical energy form of a first bulk energy delivery network, is controlled to produce a second physical energy form of a second bulk energy delivery network and inject the second physical energy form into the second bulk energy delivery network. A second energy converter that can consume the second physical energy form of the second bulk energy delivery system is controlled to produce the first physical energy form of the first bulk energy delivery network and inject the first physical energy form into the first bulk energy deliver network. The controlling of the first energy converter and the controlling of the second energy converter coordinated to achieve technically advantageous effects and objectives.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

Like reference symbols in the various drawings indicate like elements.

DETAILED DESCRIPTION

Figure 1:
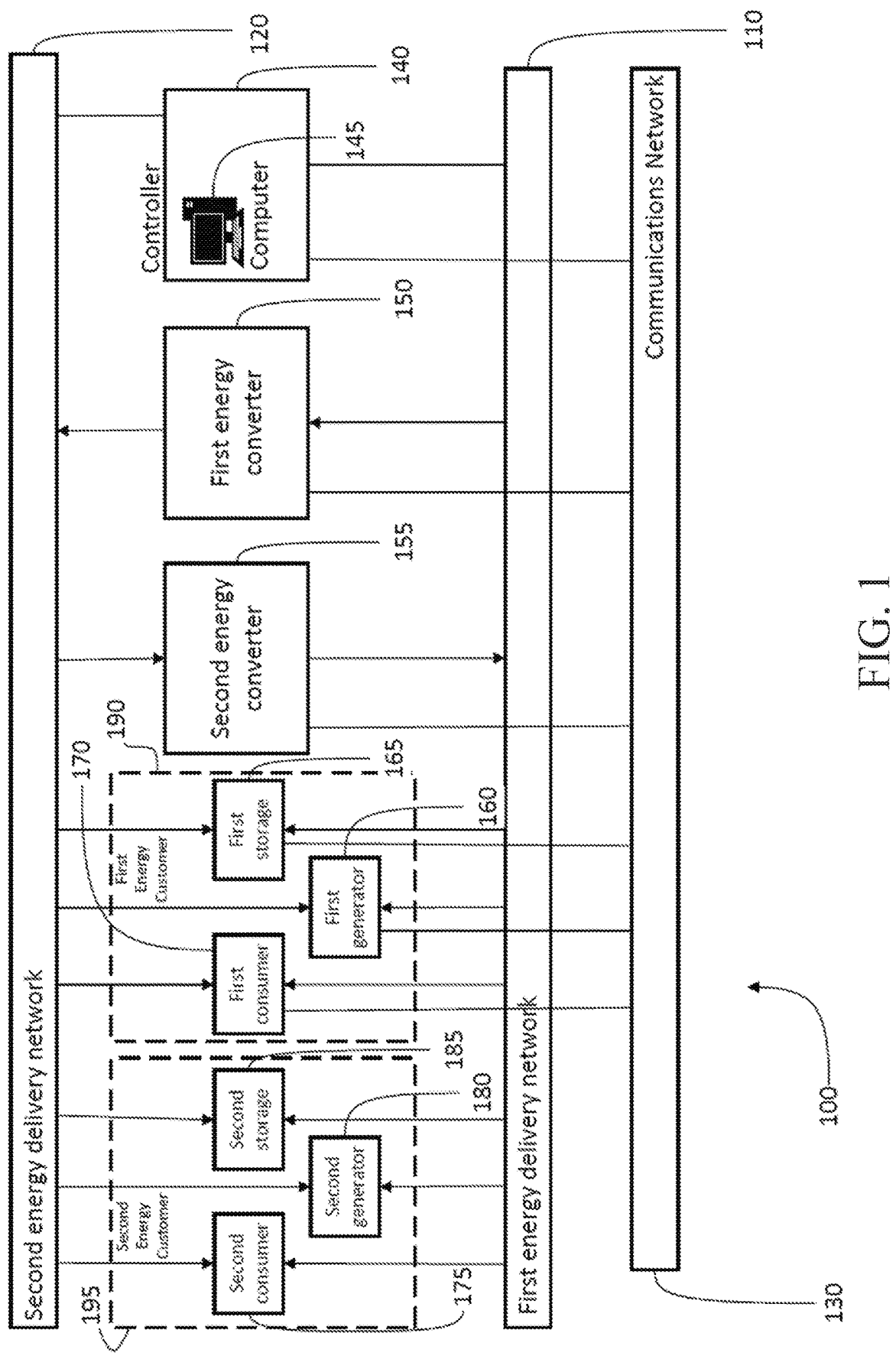
FIG. 1 is a system block diagram illustrating an example operating environment of an integrated energy delivery network.

Energy can include a measure of the potential for performing useful work. Multiple energy forms can be transported in multiple modes. Common forms of energy are gravitational energy, kinetic energy, heat energy, elastic energy, electrical energy, chemical energy and radiant energy. Commercially, large quantities of energy can be transported using, for example, two types of modes of delivery. The first type of energy delivery includes delivering electrical energy and the second type of energy delivery includes delivering chemical energy.

Electrical energy can be generated, for example, from a fuel source using electrical generators, such as turbines, hydroelectric dams, and/or the like. Electrical energy can be delivered, for example, in bulk to consumers over electrical transmission and distribution networks made of conducting cables. Also, electrical energy can be converted into useful work by, for example, directly driving an electrical load, such as a light, heater, motor, and/or the like.

Chemical energy can be delivered, for example, in bulk in the form of natural gas from wellheads and long-term storage facilities to consumers over pressurized pipelines. Chemical energy can be converted into useful work for applications such as heating by, for example, burning the natural gas or converting the heat from burning into another form of energy, such as electricity, mechanical motion, and/or the like. Combined heat and power (CHP) applications can, for example, include natural gas used for both heating and mechanical work.

Kinetic energy can be delivered, for example, in bulk in the form of running or falling water through a river system or other geologic drainage system. Kinetic energy can be converted into useful work for applications such as mechanical movement by directly driving a mechanism, such as grinder for milling grains. The kinetic energy can also be converted into another form of energy, such as electricity, by directly driving a turbine in a hydroelectric dam or steam plant.

To avoid ambiguities in terminology in the marketplace of different utilities of different energy forms and different energy delivery networks, the expression, "energy converter," is used herein as follows. In the electricity industry, at least, expressions like "generator" or "motor" are common. In a strict physical sense, there are no "generators" of energy. The Law of Conservation of Energy dictates that energy is neither produced nor consumed and is only transformed. Despite this, the expression "generator" and cognates are common in the electricity industry, and herein, "generator" is used in contexts where the subject device is fulfilling a role that is typical and commonplace today in the electricity industry. Namely, "generator" herein refers to a device that is controlled for the purpose of supplying electricity to an electricity consumer who is using the electricity directly to perform desired work. Such work includes making widgets using a machine, pumping water using a pump, heating a room by boiling water or heating air, moving people with escalators and elevators, and so on. This is common use of energy delivered over an energy delivery network to consumers. This invention describes moving energy not just within an energy delivery network but also between different energy delivery networks. This invention teaches process(es) (performed by apparatus, software, hardware) that connect and coordinate these energy delivery networks and coordinate the movement of energy between them by performing the transformation of energy forms (e.g. electricity into specific molecules through endothermic chemical reactions, mechanical motion into electricity, and the like). In some cases, these devices might even be "generators" in the common electric utilities sense, such as a hydroelectric generator or a gas turbine. Since the present description includes such devices fulfilling both (1) their common (electric utilities) roles in a standalone energy delivery network and (2) their role described herein of moving energy between different energy delivery networks, the expression, "energy converter," is used herein specifically for a device that is fulfilling that latter (2) role specifically (with cognate expressions for process(es) performing that latter role). That is, an energy converter is connected between two energy delivery networks and it is being controlled to move energy from one energy delivery network into another energy delivery network and performing the necessary conversion of energy form as required by the receiving energy delivery network (e.g. electricity from an electric grid is converted into hydrogen molecules under pressure and concentration levels suitable and safe for delivery by a gas pipeline). Thus understood, the term "energy converter," may refer to "electric generator" or even "generator" in some industry terminology contexts, and generally, refers herein to a converter of energy forms according to the present application.

Herein, the expressions "energy delivery network" and "bulk energy delivery network" refer to an energy delivery network that delivers energy in bulk. That is, the network carries energy in sufficient quantity for the needs of cities and similarly large congregations of energy consumers (such as towns, university campuses, military bases, chemical plants, mining operations).

Herein, the expressions, "local storage," "store," or "energy store" and cognates of "store" are used. In contrast, expressions based on "buffer" are also used (e.g. "energy buffer"). The "buffer" devices herein have strictly limited ability to store and return an amount of energy. Examples of energy buffers include lithium-ion batteries, compressed gas cannisters, air bladders, elevated water tanks, hot water tanks, and similar. Similarly to the expression "generator" herein, the first forms ("storage" or "store") refer to devices being used in a typical sense. An example is a lithium ion battery in an electric vehicle plugged into the electric grid and being used to provide service to the electric grid while the car is parked. Such batteries may also be used within a building to store energy from solar panels during the day for use by the occupants in the evening when the irradiance on the panels is reduced. In contrast, the second form ("buffer" or "energy buffer") refers herein to the device specifically being used to facilitate the energy conversion process performed by the energy converters, specifically to improve the responsiveness to control of these devices and processes, in accordance with the teachings of the present application.

One or more of the following features can be combined in any feasible combination. For example, a controller can receive data characterizing the operational state of a first energy delivery network and a first energy delivery network operational target. The controller can receive data characterizing the operational state of a second energy delivery network and a second energy delivery network operational target. A deviation between the first energy delivery network operational state and the first energy delivery network operational target can be determined ("first energy delivery network deviation"). A deviation between the second energy delivery network operational state and the second energy delivery network operational target can be determined ("second energy delivery network deviation"). A first energy delivery network operational setpoint and a second energy delivery network operational setpoint can be computed using the first energy delivery network deviation, the first energy delivery network operational target, the second energy delivery network deviation, the second energy delivery network operational target, or a combination thereof. Herein, for economy of expression, the term, "setpoint" is used to refer to the desired operating point of a component of an energy delivery network (including energy converters, storage, generators, energy buffers and the like). Conversion of a portion of energy from an energy delivery network for injection into another energy delivery network, herein we refer to as an "operational setpoint" where the context makes it clear that this is the setpoint of an energy converter. Conversion of a first portion of energy from the first physical energy form can be controlled using the first operational setpoint (of first energy converter). Transformation of a second portion of energy from the second physical energy form (different from the first physical energy form) can be controlled using the second operational setpoint (of second energy converter). The first energy portion can be transformed by a first energy converter and the second energy portion can be produced by a second energy converter (different from the first energy converter). The first energy converter can be controlled by the controller to provide the first portion to the first energy delivery network and the second energy converter can be controlled by the controller to provide the second portion to a second energy delivery network different from the first energy delivery network.

A program for at least the first operational setpoint and the second operational setpoint can be determined. The program can include at least one constraint. A feasible solution of the program can be determined. At least one constraint of the program can include the first operational target and the first operational state. The program can include a linear program, an integer program, a mixed integer linear program, a quadratic program, a neural network program, a dynamic program, and/or an analytic program. The feasible solution can include the first operational setpoint and the second operational setpoint.

The controller can receive data characterizing a measurement from a local generator. Local generators are analogous to local energy consumers (such as motors, lights, heating equipment, and other loads). They are typically owned by customers of an energy delivery network operator (e.g. a commercial building or a factory) and most typically are controlled entirely by the customer to meet its objectives. Receiving such data, for example, is described in U.S. Pat. No. 9,762,087, which is incorporated by reference herein. The measurement can include a target average power output level. The at least one constraint of the program can include the target average power output level. The controller can receive data characterizing a measurement from a local storage. The measurement can include a target energy storage level at some future time. The at least one constraint of the program can include the target future energy storage level. The controller can receive data characterizing a measurement from a local consumer. The measurement can include a target average rate of work of a load. The at least one constraint of the program can include the target average rate of work of the load.

The first operational setpoint and the second operational setpoint can be computed by the controller based on measurements, targets, and/or constraints of, as applicable, the first energy delivery network, the second energy delivery network, controllable devices and/or measured by uncontrollable devices. The computation of a collection of setpoints for a portfolio of both controllable and uncontrollable but heterogeneous devices to meet an aggregate objective can be performed, for example, in accordance with U.S. Pat. No. 9,762,087. The first operational setpoint and the second operational setpoint can be recomputed by the controller based on changes to measurements, targets, weights, and/or constraints of, as applicable, the first energy delivery network, the second energy delivery network, controllable devices, and/or measured but uncontrollable devices. The first operational setpoint and the second operational setpoint can be computed based on measurements, targets, weights, and/or constraints, as applicable, communicated to the controller from one or more external sources (such as the control system of electric grid utility or gas utility, a local or remote operator, a remote consumer/customer of an energy delivery network, and the like). The first operational setpoint and the second operational setpoint can be computed based on measurements, targets, weights, and/or constraints, as applicable, measured directly by the controller from one or more attached sensors. The first operational setpoint and the second operational setpoint can respect constraints. The first operational setpoint and the second operational setpoint can include a tradeoff between weighted impact of operating controllable devices. The first operational setpoint and the second operational setpoint can include a tradeoff between the weighted impact due to an indirect effect or effects on measured but uncontrollable devices. The first operational setpoint and the second operational setpoint can include a tradeoff between the weighted impact of changing the energy stored in energy stores such as batteries, bladders, lakes, and the like. The first operational setpoint and the second operational setpoint can include a tradeoff due to the weighted impact of changing the energy stored in one of the energy delivery networks, either in the energy form itself or the physics of the delivery network. The first operational setpoint and the second operational setpoint can include a tradeoff due to the weighted impact of the average utilization of the peak capacity of one of the energy delivery networks. The first operational setpoint and the second operational setpoint can include a tradeoff due to the weighted impact of variability in instantaneous, delivered power of one of the energy delivery networks. The first operational setpoint and the second operational setpoint can include a tradeoff due to the weighted impact of instantaneous energy loss of one of the energy delivery networks. The first operational setpoint and the second operational setpoint can include a tradeoff between weighted deviations from the first operational setpoint and/or the second operational setpoint. The weight or weights that are used to scale the weighted impacts can be statically configured, received over a communications network, or adaptively adjusted in response to a change in the first operational state and the second operational state.

The first physical energy form can be stored in a first energy buffer connected to the first energy delivery network either before being transformed by the first energy converter and injected to the second energy delivery network, or after being transformed by the second energy converter but before being injected to the first energy delivery network. The second physical energy form can be stored in a second energy buffer connected to the second energy delivery network before being transformed by the second energy converter and injected to the first energy delivery network, or after being transformed by the first energy converter but before being injected to the second energy delivery network.

The use of energy buffers here handles mismatches between the characteristics or the control of the energy delivery networks. For example, consider the case where the first energy delivery network is an electric grid, the second energy delivery network is a natural gas pipeline, and the first energy converter is a hydrolyzer that uses electricity to produce hydrogen and inject it into the gas pipeline. In a condition where the electric grid is oversupplying it's directly connected customers, inadvertently exporting energy to its neighbors, increasing the system frequency, causing electric grid stability issues, or planning for short or long term average delivered energy discrepancies, the control system described herein may decide to store the excess energy in the natural gas pipeline. In this case, the control system will power up the hydrolyzer which will start using electricity to split water into hydrogen and oxygen gas molecules, thereby storing chemical energy in the gases, and consume additional electricity to pump the hydrogen into the pressurized pipeline. These processes of running the chemical reaction and pressurizing the gas will have time constants associated with them. The machinery takes time to ramp up to speed and the pressure takes time to build to the point of exceeding the current pipeline pressure. During this window, the first energy buffer can temporarily store excess electrical energy from the electric grid until the hydrolyzer can get to an operating state where it can convert the energy in the gas pipeline.

There is a second usage for the energy buffers. As already stated, there are mismatches between the characteristics and control of the energy delivery networks, and further the control system is unable to perfectly predict changes in the states of the energy delivery networks and the oversupply and undersupply conditions that do occur. Some energy delivery networks can change state quite rapidly, moving from an oversupply condition to an undersupply condition faster than the first energy converter and second energy converter can respond. The energy buffers, if appropriately chosen, can be used to effectively reverse a control decision to a limited extent. Consider the previous paragraph case of oversupply on the first energy delivery network (the electric grid in the example). Consider that a first energy buffer is part of the system and it is a lithium ion battery with a high-power inverter. This means the battery can rapidly charge and discharge. The control system has triggered the hydrolyzer to turn on and convert the excess electrical energy into chemical. The hydrolyzer is ramping up and the battery is charging at high power. The grid rapidly switches from oversupply to undersupply (such as might happen from a generator failure or outage). In this case, the control system can turn off the hydrolyzer, and possibly even turn on the second energy converter to meet the undersupply condition. But, again, there is a ramp up time for the second energy converter and further there is a ramp down time for the hydrolyzer. The first energy buffer can now return energy to the first energy delivery network (the electric grid in this example) thereby reducing the aggravating impact of the ramp down time of the first energy converter (hydrolyzer) and reducing the impact of the ramp up time of the second energy converter.

The third case for using the energy buffers is to transform and store energy based on predicted need. To continue with the previous example where the first energy delivery network is an electric grid, the second energy delivery network is a natural gas pipeline, the first energy converter is a hydrolyzer and the first energy buffer is a lithium ion battery with a high power inverter. In this example the second energy converter is a gas turbine. Both energy delivery networks may be operating proximate optimal conditions but the previous set of control actions have left the first energy buffer (battery) near depletion, i.e. with little stored energy. The control system can control the gas turbine to operate at a low power setpoint to gradually bring the state of charge of the battery to a medium level so that the battery is in a better state to respond quickly under the direction of the control system to support a future grid undersupply condition. At the same time, the control system may not fully charge the battery so that the battery can also be used to support a potential future grid oversupply condition, and work (as described previously) to store the excess energy while the hydrolyzer is ramping up.

A first consumer with access to both energy delivery networks can consume the first physical energy form in advance of an expected consumption of the second energy form from the second energy delivery network. This results in a first net, or "virtual," energy being delivered to the second energy delivery network by reducing consumption in the second energy delivery network. The operational state of either the first or second energy delivery network can include instantaneous consumption and production of its respective energy across the respective energy delivery network. The operational state of either energy delivery network can include some expected consumption of the respective energy form over the respective energy delivery network.

The first operational target can include reducing transmission loss, increasing total energy delivery capacity, increasing total stored energy, decreasing total stored energy, optimizing stored energy for a long term objective, decreasing total operational cost, decreasing cost of a marginal unit of energy, increasing resilience to variability, reducing mechanical wear-and-tear on electric substation and generation equipment, and/or minimizing fossil fuel cost. The first physical energy form can include electricity. The second physical energy form can include hydrogen, natural gas, and/or water. The first energy delivery network can include an electrical grid. The first energy delivery network can include another type of energy delivery network with no intrinsic energy storage capability within either the network infrastructure itself or the medium of energy transfer (such as electrons moving in a conductor). The term herein, "intrinsic storage," in respect of an energy delivery network, refers to its intrinsic capability to store the energy of the energy form it delivers either within the network infrastructure itself or the medium of energy transfer. One way to understand "intrinsic storage" is to consider what would happen if the entire energy delivery network where "turned off". An energy delivery network with intrinsic storage can have energy within it, even if all supply to the network is zero. The second energy delivery network can include a natural gas pipeline or a river system. The second energy delivery network can include another type of energy delivery network that does have intrinsic storage (i.e. the energy storage capability within either the network infrastructure itself or the medium of energy transfer (such as a flowing volume of pressurized natural gas in a gas pipeline, flowing water through a series of dammed reservoirs on a river system, or pressurized steam moving through a steam piping network)). The first energy converter can include a hydrolyzer. The second energy converter can include a combined heat and power unit. The second energy converter can include a gas turbine. The second energy converter can include a hydroelectric generator. The second energy converter can include a steam turbine.

A first energy converter that consumes a first energy form of a first energy delivery network can be controlled to produce a second energy form of a second energy delivery network and store the second energy form in a second energy buffer. A second energy converter that consumes the second energy form of the second energy delivery system can be controlled to produce the first energy form of the first energy delivery network and stores the first energy form into a first energy buffer. Note that this case is demonstrated in a previous example.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

Energy delivery networks can be designed primarily to deliver energy but they can include different secondary characteristics. For example, a chemical energy delivery network has intrinsic storage within the network. That means it can store energy directly within the gas pipeline by changing the chemistry, pressure, and/or the like of the contents of the pipeline. Since, in some cases, the pipeline can include millions of cubic meters of space (e.g., thousands of kilometers of pipeline), it can store enormous amounts of energy directly within the network continuously being supplied and used.

Similarly, a river system, which is a naturally occurring kinetic energy delivery network, can also store energy by increasing the volume of water held behind one or more natural or artificial barriers such as a dams. Some river networks span thousands of kilometers of linear distance and hundreds or thousands of meters of elevation change while carrying millions of cubic meters of water. Such river networks can store enormous amounts of energy.

A steam pipe system that delivers heated steam to buildings in an urban core or around a campus is also an example of an energy delivery network with intrinsic storage. The temperature and pressure of the steam are both variables that can be controlled to alter the amount of energy stored directly within the energy delivery network.

Conversely, storing energy within an alternating current electrical energy delivery network may not be practical and typically the electrical energy must be converted to another form of energy and removed from the network in order to be stored. Electrical energy can be stored on the edges of the grid, for example, by storing water behind a dam, accumulating a pile of coal for later conversion into electricity, creating ions in a chemical solution (e.g., a battery), and/or the like, but may not be stored within the network itself. But such energy storage techniques can be expensive and are not widely implemented in existing infrastructure. Many modern societies have invested in multiple energy delivery networks, such as electric grids and natural gas pipelines, but these networks can be operated independently, and generally are.

Some implementations of the present inventions integrate operation of energy delivery networks that are often independently owned and/or operated, such as electric grids and natural gas pipelines, such that energy created in one energy delivery network can be stored or used in another. Even when the different energy delivery networks are owned or operated by the same entity, the present inventions are advantageously applicable. For example, a controller can determine a supply of electricity in an electrical delivery network, such as an oversupply, an undersupply, and/or the like. Upon determining an oversupply of electricity (e.g. excess electricity created from solar panels during the day) in the electrical delivery network, for example, the electricity can be transformed into hydrogen using a conventional hydrolyzer. The hydrogen can be injected into a chemical energy delivery network, such as a natural gas pipeline. Upon determining a short term undersupply of electricity (e.g. the wind suddenly dies down through a wind farm) or a medium term undersupply of electricity (e.g., solar panels cannot generate electricity at night) or a long term undersupply of electricity (there is less total daily solar irradiance in the winter) in the electrical delivery network, for example, natural gas in the chemical energy delivery network can be transformed into electricity using a combined heat and power generator. The electricity can then be provided to the electrical delivery network to meet consumer electricity demand. Upon determining a geographically localized and remote undersupply of electricity (e.g. the east coast of the United States) in the electrical delivery network, for example, the natural gas pipeline can deliver energy from north western Canada at low loss and then be provided to the local electrical delivery network to meet consumer electricity demand. By integrating operation of independent (and even where co-owned/operated) energy delivery networks, operation of each individual energy delivery network can be improved and/or made more efficient. For example, the total daily or even seasonal amount of energy delivered on the electric grid can be dramatically increased from its historical average, even as much as tripling or quadrupling the amount of energy delivered over a typical electric grid. Many electric grids have an average utilization of well below 50%. That means the average power delivered over the electric grid is less than half of the peak power capacity. As another example, energy delivery can be optimized to one of several potential energy delivery objectives such as increased energy storage, reduced emissions, reduced loss, reduced cost, and/or the like. As another example, energy delivery can address short-term operational issues, such as capacity relief, in the event of an equipment outage. As another example, energy delivery can address geographically localized carbon emission regulation requirements and/or targets. As another example, energy delivery can shift energy from day to night, from night to day, from day to day, or even from season to season.

The preparation of the weights used by optimization calculations of the controller is the key step to achieving a specific energy delivery goal. For example, where the first energy delivery network is an electric grid and the second energy delivery network is a natural gas pipeline, hydrolyzers are in place at substations, and CHP units are in place at large heat and electricity consumers, the weights used to calculate the hydrolyzer and CHP unit operational setpoints can be chosen so that higher pressure readings on the natural gas pipeline, higher hydrogen concentrations in the gas pipeline, rapid response to residential and commercial building solar panel power variability, and high utilization of the transmission lines are favored much more highly than gas pipeline utilization, gas revenue, electrical line losses, electricity imports and exports, mechanical wear and tear on the hydrolyzers and CHP units, and fuel costs of the hydrolyzers and CHP units. A utility operator or local government might require such emphasis for the following effects: increased utilization of solar panel output energy even in the middle of the day by using it when possible and storing it in the gas pipeline when there is more energy than demand, intra-day shifting of the energy produced by the solar panels from midday to evening when energy demand peaks, rapid reaction to both variable solar panel output and variable energy demand with counteracting stabilization actions by using the gas pipeline as local backup power, and increased transmission line utilization so that a much greater portion of the energy demand is being met with electricity. The tradeoff that these weights allow to achieve these benefits is potentially increased transmission line losses, reduced revenue from fossil fuel consumption, and wear-and-tear on the hydrolyzers and the CHP units.

FIG. 1 includes a system block diagram illustrating an example integrated energy delivery network 100 facilitating integration of a first energy delivery network and a second energy delivery network. Integrated energy delivery network 100 includes a first energy delivery network 110, a second energy delivery network 120, a communications network 130, a controller 140, a first energy converter 150, and a second energy converter 155. Utilizing first energy converter 150 and a second energy converter 155 controlled by a controller 140 to transform a first form of energy from a first energy delivery network 110 into a second form of energy for a second energy delivery network 120, and vice versa, can improve operation of each individual energy delivery network and result in more efficient energy delivery, or some other objective.

Integrated energy delivery network 100 can include a first energy delivery network 110 and a second energy delivery network 120. An energy delivery network can transport an energy form across a network. For example, first energy delivery network 110 can include an electric grid that delivers electricity and second energy delivery network 120 can include a natural gas pipeline that delivers natural gas. An energy delivery network can be operated by an operator who sets operational targets and/or constraints for the energy delivery network.

Operational targets and/or constraints for an energy delivery network can influence operation of elements connected to the energy delivery network. For example, an operator of an electric grid can set a target of delivering constant power from a substation in the electricity distribution network. Such an operational target can be selected because it can improve the overall efficiency of the delivery network. For example, the electrical energy delivery network can be improved by reducing energy losses due to transmission, increasing total energy delivery capacity, reducing mechanical wear-and-tear on substation and generator equipment, minimizing fuel cost, and/or the like. For another example, an operator of an electric grid can set a target of using locally all energy produced by residential solar panels at midday even though the natural consumption levels on the electric grid at this time are below the production levels. Such an operational target can be selected to reduce emissions by shifting energy from midday when non-emitting energy is readily available to evening when there is more demand for energy than there is energy from non-emitting production. In this case, storing energy in the gas pipeline for a few hours shifts the energy from midday to evening. For another example, an operational target can be selected to shift energy from summer to winter. The longer summer days result in greater non-emitting production than can be achieved in the winter. In this case, storing energy in a long gas pipeline or river network can shift energy between seasons.

Communications network 130 can facilitate communication between components of integrated energy delivery network 100 and controller 140. For example, communications network 130 include a communications interface that can enable wired communication, such as via Ethernet, and can include a transceiver for communicating via a wireless protocol, such as a Bluetooth protocol, cellular protocol, IEEE 802.11b/g/n/ac direct sequence (Wi-Fi) protocol, near field communication (NFC) protocol, a radio frequency identification (RFID) protocol, and/or the like. Wired and/or wireless communication via communications network 130 can be enabled via any communication protocol, such as transmission control protocol/internet protocol (TCP/IP). Wireless cellular connectivity can include 4G, 4G LTE, 5G, or any mobile communication standard.

Controller 140 can include computer 145 communicative over communications network 130. Controller 140 can include environmental sensing. A controller 140 that includes computer 145, an interface to the communications network 130, and integrated environmental sensing may also be called a "sensing, communications and control" computer. Controller 140 can improve the stability, robustness, and/or quality of energy delivered by first energy delivery network 110. In some implementations, controller 140 can directly sense and measure first energy delivery network 110 and/or second energy delivery network 120. In some implementations, controller 140 can communicate with operators of first energy delivery network 110 and/or second energy delivery network 120. Controller 140 can communicate with first energy delivery network 110, second energy delivery network 120, first energy converter 150, second energy converter 155, first generator 160, first storage 165, and first consumer 170 over communications network 130.

First energy converter 150 can convert first form of energy delivered by first energy delivery network 110 into second form of energy delivered by second energy delivery network 120. Controller 140 can control the rate by which first energy converter 150 converts the first form of energy into the second form of energy. The produced second form of energy can be injected into second energy delivery network 120 for storage or for subsequent use by consumers receiving the second form of energy from second energy delivery network 120. For example, first energy converter 150 can include a hydrolyzer. A hydrolyzer can use electricity and perform hydrolysis to split water molecules into hydrogen gas and oxygen gas. The hydrogen gas obtained from the hydrolyzer can be injected into second energy delivery network 120, which in this case might be a natural gas pipeline. Generally, natural gas includes naturally a variable amount of hydrogen. A hydrolyzer can increase the concentration of hydrogen gas in the natural gas pipeline. In operation, however, to prevent unsafe conditions, safety standards can require that the pressure in the pipeline remains below safety thresholds and the ratio of hydrogen to other components of the gas remains within normal variability. As such, equipment connected to the natural gas pipeline will not be adversely affected by the injection of hydrogen gas into the pipeline while in compliance with safety standards. Such a hydrolyzer may be collocated with large-scale generators connected to the electric grid, such as hydroelectric generators, gas turbines, steam turbines, wind farms, nuclear generators or the like. Furthermore, a hydrolyzer may be located at an electric grid substation, where the transmission network connects portion of the electric grid to the distribution network portion of the electric grid. Furthermore, a hydrolyzer may be located at an end-user facility connected to the distribution network portion of the electric grid, such as at a factory. The choice of location of a hydrolyzer influences its ability support different operational targets. A hydrolyzer (and in many applications, a bank of hydrolyzers) collocated with large scale generation is better suited for moving energy from the electric grid into a natural gas pipeline for transmission over distances that are inefficient for electric transmission. A hydrolyzer at a substation will be better suited to increasing the utilization factor of an electric grid by reducing power variability and loss while simultaneously increasing total delivered energy. In addition, where the first energy converter 150 has byproducts, these byproducts can also be delivered to consumers. For example, the heat byproduct of a hydrolyzer is oxygen gas which can be supplied to users for industrial processes. For another example, first energy converter 150 can be a physical water pump that pumps water into reservoirs in a river network that includes hydroelectric dams. Pumping the water from below the reservoir up into the reservoir stores energy in the river network. This stored energy can be used either directly by using the moving water of the river to drive mechanical motion, or it can be converted back into electricity through the dam (i.e. hydroelectric generator). For another example, first energy converter 130 can be a "virtual" energy converter (as explained below) that effectively acts between a first reservoir and a second reservoir on the same river network. The first reservoir is behind a first hydroelectric dam and the second reservoir is behind a second hydroelectric dam. A downstream consumer how its energy demand is met by two hydroelectric dams and the other forms of electricity generation. It is noteworthy that dam reservoirs are vast energy storage systems. Further, the two reservoirs being on the same river network are coupled. Water in the upstream reservoir is available to go through both dams subject to the speed of the river therebetween. Water in the second reservoir is available to go through only the second dam. When excess generation is coming from elsewhere in the electric grid, the "virtual" pump effect can be achieved by the coordinated control of the dams by the controller, which can retain water in the upstream reservoir by curtailing flow from that reservoir while simultaneously maintaining or increasing the flow from the downstream reservoir at a rate sufficient to meet any water demand from water customers downstream of the reservoirs exclusively or at least primarily with the downstream reservoir, thereby virtually pumping water upstream. An example where such a control system could be employed is the Columbia River system that spans southern British Columbia and Northwest United States. This river system has multiple hydroelectric dams along its length. The Columbia River system has eleven reservoirs behind dams with a total energy storage of:

$$\Sigma_i E_i = \Sigma_i (V_i = E_{j=i}{}^N h_{i_j}) E_{total}$$

where:
E$_{total}$ is the total energy stored in the river network,
E$_i$ is the energy stored in a single reservoir,
V$_i$ is the volume of water in the reservoir behind dam, in liters,
h$_i$ is the height of V$_i$ in meters, and
the subscript i is over the set of dams on the river network in the order they are situated on the river network.

The internal summation is because the water in an upstream reservoir has gravitational potential energy due to the height of all downstream dams. The Columbia River System includes the Mica Dam, the Revelstoke Dam, Libby Dam, Duncan Dam, Corra Lin Dam, Brilliant Dam, Keenleyside Dam, Boundary Dam, Seven Mile Dam, and Waneta Dam. A control system can use this equation to manage the total stored energy of the system in the reservoirs. This control system is converting energy from gravitational potential energy to electrical energy when allowing water to flow downstream through an energy converter (hydroelectric generator) from an upstream reservoir to a downstream reservoir. The upstream reservoir water level decreases in height while the adjacent downstream reservoir water level increases in height. Conversely, the control system is converting energy from electrical energy to gravitational potential energy by reducing or halting the flow of water from an upstream reservoir while allowing the flow of water from a downstream reservoir. The downstream reservoir water level decreases in height while the upstream reservoir water level increases in height (due to the natural flow of the river). Herein, the expression "virtual pumping" is used because although the control system is not directly controlling a pump to move (physically) water from the downstream reservoir to the upstream reservoir, the control system allows the upstream reservoir to fill (i.e. water is not being released) while allowing the downstream reservoir to drain its water to generate electricity. The net effect of the preceding is to "virtually pump" water up-stream. The preceding recognizes that the reservoirs are not static because they are on the same, fluid energy delivery network, the river system. The continual flow of the water makes this "virtual pumping" possible without performing physical pumping. For another example, where a first energy customer 190 can include first generator 160, first storage 165, or first consumer 170 each of which uses energy from first energy delivery network 110, second energy delivery network 120, or both energy delivery networks to do work can choose when to do at least some of that work or which form of energy to use to do at least some of that work it has capability to "virtually move" energy between energy delivery networks 110 and 120. Such a generator 160, storage 165, consumer 170, or portfolio of aggregated devices can be controlled by controller 140 to act as a "virtual energy converter". Such a case is when first consumer 170 needs to drive a process, such as for boiler 230 or absorption chiller 210 or both. When the equipment can be controlled to use energy from energy delivery network 110 or energy delivery network 120, then controlling the equipment to prefer to use energy from first energy delivery 110 network instead of second energy delivery 120 network when the former has an excess of available energy, then the effect is to virtually move energy from first energy delivery network 110 to second energy delivery network 120. The reverse case is also true. Controlling the equipment to prefer to use energy from second energy delivery network 120 instead of first energy delivery network 110 when the latter has an shortfall of available energy, then the effect is to virtually move energy from second energy delivery network 120 to first energy delivery network 110.

Second energy converter 155 can convert a second form of energy from second energy delivery network 120 into a first form of energy from first energy delivery network 110. Controller 140 can control the rate by which second energy converter 155 converts second form of energy into the first form of energy. Second energy converter 155 can receive second form of energy from second energy delivery network 120 and produce a first form of energy. The produced first form of energy can be added to first energy delivery network 110 for storage or subsequent use by consumers receiving the first form of energy from first energy delivery network 110. For example, second energy converter 155 can include a combined heat and power unit. A combined heat and power (CHP) unit can burn natural gas to drive a turbine that produces electricity and heat. The electricity can be injected into first energy delivery network 110. In addition, where second energy converter 155 has byproducts, these byproducts can also be delivered to consumers. For example, the heat byproduct of a CHP unit can be used to provide heat to consumers of heat. As another example, second energy converter 155 can include a gas turbine. A gas turbine can burn natural gas to drive a turbine that produces electricity. With a gas turbine, generally the heat produced by the unit is considered a waste byproduct and is simply dissipated in the environment.

Energy converters 150 and 155 may be coordinated to reverse the average direction of flow of one of the energy delivery networks, or to support (on average) reversing the flow of one of the energy delivery networks. For example, using a natural gas pipeline (whether pre-existing or building additional one) to (on average) sequester carbon in the same underground formations from which the natural gas was originally extracted. The gas pipeline flow could not be universally reversed because there are still customers for the energy delivered by the pipeline. But methane producing sources, for example, could be connected to what has historically been the demand-side of the gas pipeline. In such a case, the electric grid could support the gas pipeline by reversing the flow of gas from supplying to sequestering or the reverse, based on the availability of carbon-capturing processes, the current demand for energy by gas customers and the desired average rate of carbon sequestration.

Figure 4:
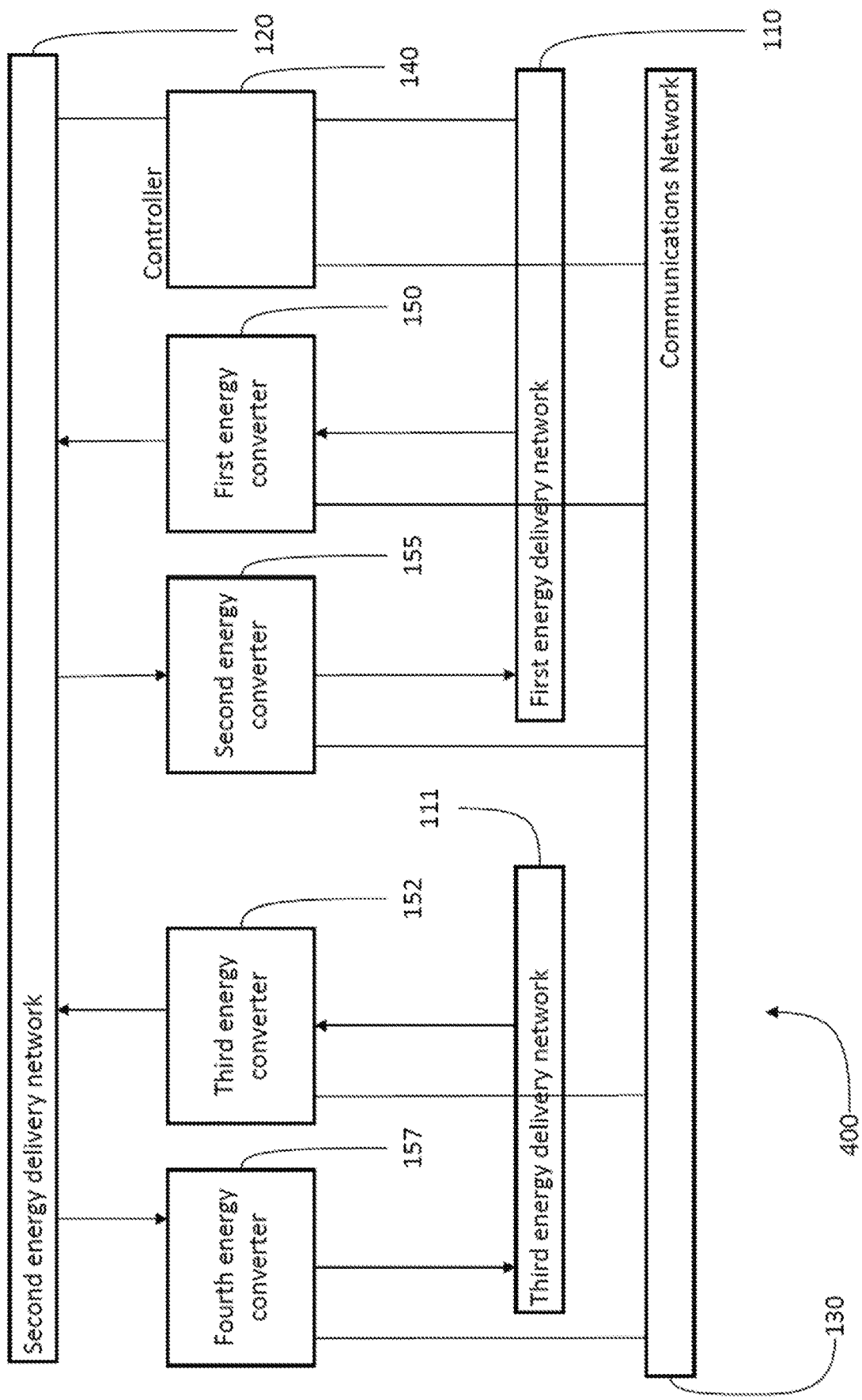
FIG. 4 is a system block diagram illustrating an example operating environment of an integrated energy delivery network that can move energy across long geographical distances.

Energy converters 150 and 155 may be coordinated to move energy between energy delivery networks as illustrated in FIG. 4 in integrated energy delivery network 400 with three energy delivery networks, 110, 111, and 120. Two are of the same type, 110 and 111. For example, two electric grids may be geographically separated. They can be connected by electrical wires to move energy in the form of electricity between them, but that method risks significant failure modes due to the geographic separation. Using wires to electrically couple the grids means they must share a common system frequency and that faults in one grid will immediately affect the other. With a natural gas pipeline that spans the geography between the electric grids, then a pair of energy converters 150 and 155 can couple electric grid (as energy delivery network 110) to gas pipeline (as energy delivery network 120), and another pair of energy converters 152 and 157 can couple second electric grid (as energy delivery network 111) to gas pipeline 120 (as shown in FIG. 4). Controller 140 can coordinate all four energy converters (150, 152, 155, and 157) to move energy between electric grids 110 and 111 using gas pipeline 120 as the energy transport mechanism. This creates no electrical coupling between electric grids 110 and 111 so they do not share a system frequency. Gas pipeline 120 does not suffer the same long-distance transmission failure modes that an electrical connection between the electrical grids suffers. Also, the injection of the energy into the gas pipeline can be performed when it is optimal for the exporting electric grid and only removed when it is optimal for the importing electric grid. This would be used, for example, to move energy west to east (or reverse) across large geographies to make optimal use of solar irradiance across time zones and population centers.

Integrated energy delivery network 100 can include elements in communication with controller 140 over communications network 130 and/or elements not in communication with controller 140. For example, elements such as first generator 160, first storage 165 and first consumer 170 can communicate with controller 140 over communications network 130. Second energy customer 195 can include elements such as second generator 180, second storage 185, and/or second consumer 175 that may not be in communication with controller 140.

In some implementations, controller 140 can communicate with operators of first energy delivery network 110 and second energy delivery network 120. For example, controller 140 can receive operational state, targets, constraints, and/or the like from an operator of first energy delivery network 110 and an operator of second energy delivery network 120 in real time (e.g., received at a rate of 1 Hz or more frequently). For example, controller 140 can receive measurements from an energy delivery network characterizing a real time deviation between an operational target of the energy delivery network and the operating state of the energy delivery network.

In some implementations, controller 140 can communicate directly with first energy delivery network 110 and second energy delivery network 120. And controller 140 can communicate with first energy converter 150, second energy converter 155, first generator 160, first storage 165, and first consumer 170. For example, controller 140 can receive real time measurements (e.g., measurements received at a rate of 1 Hz and/or more frequently) from first energy delivery network 110, second energy delivery network 120, first energy converter 150, second energy converter 155, first generator 160, first storage 165, and/or first consumer 170.

As explained above, controller 140 can receive operating targets and/or constraints from first energy delivery network 110, second energy delivery network 120, and/or operators of first energy delivery network 110 and second energy delivery network 120. In some implementations, controller 140 receives real time measurements from the operator of first energy delivery network 110. The received measurements can include a deviation between the state of first energy delivery network 110 and the operational target of first energy delivery network 110. In some implementations, controller 140 can receive real time measurements from first energy converter 150, second transformer 155, first generator 160, first storage 165, and first consumer 170.

For example, first generator 160 can be connected to first energy delivery network 110, second energy delivery network 120, or both. First generator 160 can include intermittent local generation. For example, first generator 160 can include solar panels, wind turbines, and/or like intermittent renewable generators. For example, first generator 160 can include methane capture. Power output from first generator 160 can be dictated by environmental conditions (e.g., solar irradiance), but can be controlled in the proportion of real power and reactive power delivered to first energy delivery network 110. Controller 140 can receive real-time measurements from first generator 160, including instantaneous power output levels, real power output levels, reactive power output levels, and/or the like.

First storage 165 can be connected to first energy delivery network 110, second energy delivery network 120, or both. For example, first storage 165 can include local storage of the first energy form, such as batteries. For example, first storage 165 can include local storage of the second energy form, such as compressed gas cylinders. Controller 140 can receive real-time measurements from first storage 165, such as instantaneous energy storage level, maximum input power level, maximum output power level, ratio of output real power to output reactive power, and/or the like.

First consumer 170 can be connected to first energy delivery network 110, second energy delivery network 120, or both, and can include loads consuming the first energy form, second energy form, or both. For example, a residence has household appliances consuming the first energy form and appliances consuming second energy form, and a factory has manufacturing equipment consuming the first and second energy forms. Controller 140 can receive real-time measurements from first consumer 170, such as instantaneous input power level of the load, maximum input power level, near-term energy forecast of the load, near-term minimum energy needs of the load, near-term maximum energy needs of the load, and/or the like.

As explained above, controller 140 can receive an operational target of first energy delivery network 110 and/or second energy delivery network 120, real-time measurements including the state of the integrated energy delivery network 100 (e.g., from first energy delivery network 110, second energy delivery network 120, first energy converter 150, second energy converter 155, first generator 160, first storage 165, first consumer 170, and/or the like). In some implementations, controller 140 can receive a difference (e.g., deviation) between the state of the network and the operational targets. In some implementations, controller 140 can determine the difference between the state of the network and the operational targets.

Controller 140 can utilize the received measurements described above to determine operational setpoints for first energy converter 150, second energy converter 155, first generator 160, first storage 165, first consumer 170, and/or the like. For example, as will be described below, controller 140 can compute the operational setpoints for components of the integrated energy delivery network such that operation of the components at the operational setpoints can result in near operational target performance by first energy delivery network 110 and/or second energy delivery network 120. Combining the determined operational setpoints in aggregate can, for example, reduce and/or eliminate the real-time difference (e.g., deviation) between the power being delivered by first energy delivery network 110 and the operational target for first energy delivery network 110. In some implementations, the determined operational setpoints can reduce and/or eliminate the real-time difference between energy delivered by second energy delivery network 120 and the operational target for second energy delivery network 120.

Controller 140 can model the operational state of first energy delivery network 110 and/or second energy delivery network 120. In some implementations, the model of the operational state can include a mathematical model. For example, modeling the network can include mixed integer linear programming, analytical equations, machine learning models, linear programming approximations, dynamic programming, memorization of operating states and desired setpoints, and/or the like. By modeling the operational state of the integrated energy delivery network and determining operational setpoints for components of the integrated energy delivery network, operation of each individual energy delivery network can be improved by delivering energy more efficiently.

As described above, the operational state can be modelled. In some implementations, the model can include variables for the state of each component of the integrated energy delivery network (e.g., first energy delivery network 110, second energy delivery network 120, first energy converter 150, second energy converter 155, first generator 160, first storage 165, first consumer 170, and/or the like). And the model can include variables for the operational setpoints for each component of the integrated energy delivery network.

For example, the operational setpoints can be constrained to a fixed range (e.g., of values), a set of fixed ranges, a set of fixed values, a combination of fixed ranges and/or values, and/or the like. Each operational setpoint can include a weight. For example, the weights for each fixed value, value range, and/or the like can be used in the model to determine the relative cost of operating each component at the fixed operational setpoint value, within the operational setpoint value range, and/or the like. And weights for the state of each energy delivery network (e.g. first energy delivery network 110, second energy delivery network 120, and/or the like) can be used to determine the relative cost of operating the energy delivery network at that state. Operational setpoint ranges, energy delivery network state ranges, and/or the like can be subdivided into smaller ranges, for example, linearizing the relative cost for operating a component of the integrated energy delivery network, maintaining an operational state within the larger range where the cost can be non-linear, and/or the like.

In some implementations, the model can include constraint equations. The constraint equations can limit use of components of the integrated energy delivery network. For example, use of a component of the integrated energy delivery network can be limited (e.g., to prevent turning devices on and/or off too frequently, running first energy converter 150 and/or second energy converter 155 at the same time, and/or the like). In some implementations, the model can include an objective function. For example, an objective function can include an objective to minimize the total cost of the converged (e.g. integrated) energy delivery network.

In some implementations, mixed integer linear programming techniques are used to find the values of the variables that minimize the objective function. For example, the simplex algorithm, cutting plane methods, branch and bound methods, the ellipsoid algorithm, the interior point method, and/or the like can be used to determine the values that optimize some objective function. As described above, the variables can correspond to operational setpoints and the value determined for each variable can be provided to the corresponding component of the integrated energy delivery network as an operational setpoint.

The determined operational setpoints can cause the controllable components of the integrated energy delivery network to optimally achieve energy flows that minimize the current deviation of the state of first energy delivery network 110 from its operational target.

In some implementations, controller 140 can use a heuristic technique to determine approximate operational setpoints to minimize the objective function instead of the optimal operational setpoint. For example, the time required to compute the actual optimal operational setpoint can exceed a predetermined time bound for the computation. The time bound can be predetermined by the operator of first energy delivery network 110 and/or operator of second energy delivery network 120, constraints of the components of the integrated energy delivery network, and/or the like. Such approximation techniques can determine a feasible solution to the optimization problem within the time bound, but cannot guarantee optimality of the solution.

In some implementations, controller 140 can include a solution history database. The solution history database can include a correspondence between measured energy delivery network state and optimal setpoint values. The solution history database can be searchable based on the current state of energy delivery networks and components of the integrated energy delivery network. Controller 140 can provide operational setpoints for a similar aggregate state of the converged energy delivery network from the solution history database, for example, when an optimal solution cannot be determined within the time bounds, when a feasible solution cannot be determined, and/or the like.

In some implementations, controller 140 can receive operational constraints from the operator of second energy delivery network 120. The constraints of second energy delivery network 120 can be included when modelling the integrated energy delivery network, determining operational setpoints for components of the integrated energy delivery network, and/or the like. These additional constraints can change the results of the computation (e.g., optimal, feasible, approximate, historic, and/or the like solutions to the objective function), for example, because they can change the operating conditions under which second energy delivery network 120 can supply energy to first energy delivery network 110, under which second energy delivery network 120 can receive energy from first energy delivery network 110, and/or the like.

In some implementations, controller 140 can use an analytical equation to adequately represent the state of first energy delivery network 110, second energy delivery network 120, first energy converter 150, second energy converter 155, first generator 160, first storage 165, first consumer 170, and/or the like. The analytical equation can be solved directly to determine the operational setpoint for each component in the integrated energy delivery network.

In some implementations, controller 140 can use an online learning algorithm, dynamic programming, neural networks, and/or the like to continuously build, refine, and/or the like an internal model of the integrated energy delivery network. The internal model can, for example, map the state of first energy delivery network 110, second energy delivery network 120, first energy converter 150, second energy converter 155, first generator 160, first storage 165, first consumer 170, and/or the like to operational setpoints for the components. The internal model can receive feedback from signals received from operators of first energy delivery network 110, second energy delivery network 120, and/or the like and/or from owners of first energy converter 150, second energy converter 155, first generator 160, first storage 165, first consumer 170, and/or the like.

Figure 2:
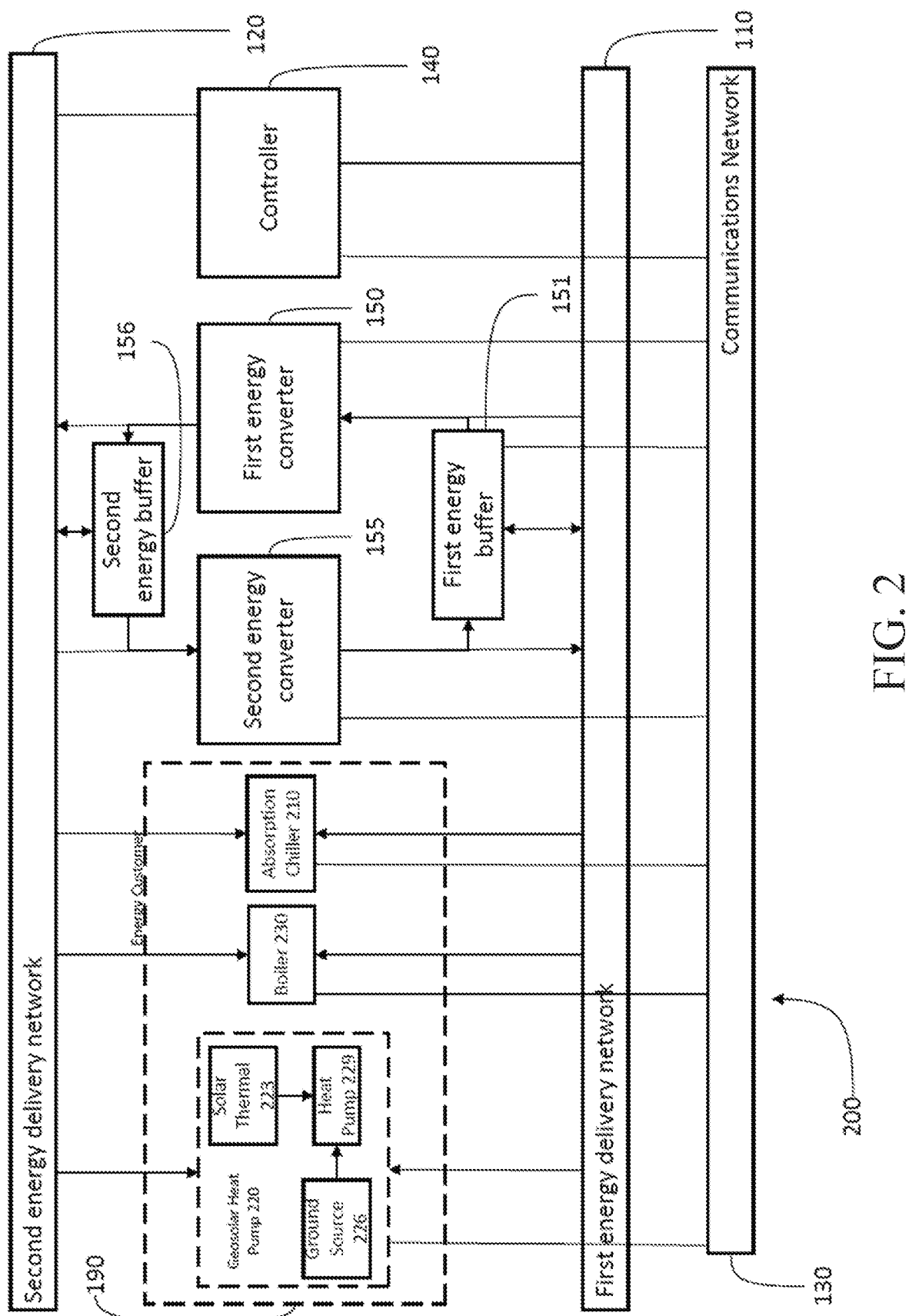
FIG. 2 is a system block diagram illustrating an example operating environment of an integrated energy delivery network.

FIG. 2 is a system block diagram illustrating an example integrated energy delivery network 200 of an implementation of the current subject matter, such as in a converged electrical distribution and gas energy delivery networks. Integrated energy delivery network 200 can include first energy delivery network 110, second energy delivery network 120, communications network 130, controller 140, first energy converter 150, first energy buffer 151, second energy converter 155, second energy buffer 156, first consumer 170. Utilizing first energy converter 150 and a second energy converter 155 controlled by controller 140 to transform a first form of energy from a first energy delivery network 110 into a second form of energy for a second energy delivery network 120, and vice versa, can improve operation of each individual energy delivery network and result in more efficient energy delivery.

First energy delivery network 110, second energy delivery network 120, communications network 130, controller 140, first energy converter 150, second energy converter 155, first energy customer 190 that includes first generator 160, first storage 165 and consumer 170 have been described above with reference to FIG. 1. First generator 160, first storage 165, and/or first consumer 170 can include absorption chiller 210, geosolar heat pump 220, and boiler 230.

Absorption chiller 210 can use a heat source (e.g., solar energy, fossil-fuel flame, resistive electrical element, waste heat, and/or the like) to provide energy to drive a cooling process. For example, a liquid refrigerant can evaporate in a low partial pressure environment and extract heat from its surroundings. The low partial pressure can allow for evaporation at a lower temperature than the boiling point of the refrigerant under average atmospheric pressure (e.g., 101.325 kPa, and/or the like). The evaporated refrigerant (e.g., gaseous refrigerant, and/or the like) can be absorbed by another liquid (e.g., a salt solution such as lithium bromide and lithium chloride, and/or the like). The refrigerant-saturated liquid can be heated and can cause the refrigerant to evaporate out of the other liquid. The hot gaseous refrigerant can pass through a heat exchanger, transferring the heat to outside the system (e.g., to surrounding ambient-temperature air, and/or the like) and condensing back into liquid form.

Geosolar heat pump 220 can transfer heat to and/or from the ground and can include solar thermal collector 223, ground source 226, and heat pump 229. Solar thermal collector 223 can collect heat by absorbing sunlight. Ground source 226 can include, for example, the top layer of the earth's crust as a source of heat. Heat pump 229 can transfer heat energy from a source of heat, such as solar thermal collector 223, ground source 226, and/or the like, to a heat sink. For example, in warmer months, heat pump 229 can transfer heat from a building, solar thermal collector 223, and/or the like to ground source 226 and in cooler months heat pump 229 can transfer heat from ground source 226 to the building. A heat exchanger can be in contact with the ground to extract and/or dissipate heat.

Boiler 230 can include a vessel in which fluid can be heated. The heated and/or vaporized fluid can exit the boiler for use in various processes and/or heating applications. In some cases, natural gas combustion can act as a heat source for boiler 230. For example, boiler 230 can include a high efficiency gas boiler. A high efficiency gas boiler can include an annual fuel utilization efficiency of more than 90% as determined, for example, by the United States Environmental Protection Agency. For example, a high efficiency gas boiler can include electronic ignition, eliminating the need for a pilot light, new combustion techniques extracting more heat from the same amount of fuel, sealed combustion using outside air to fuel the burner, and/or the like. In some cases, electrical resistance can act as a heat source for boiler 230. For example, an electric boiler can be as much as 99% efficient in converting electrical energy into thermal energy in water.

In operation, first energy converter 150 and second energy converter 155 can facilitate the movement of energy between first energy delivery network 110 and second energy delivery network 120. In addition, first consumer 170 (e.g., building central energy supply, and/or the like), with connections to both energy delivery networks and local generation, storage, and/or consumption capability (e.g., absorption chiller 210, geosolar heat pump 220, boiler 230, and/or the like), can move energy virtually between the delivery networks 110 and 120 and/or be used as energy buffer by storing energy, such as heat in this example. The arrangement illustrated in FIG. 2 (organized about first energy customer 190) shows a "virtual energy converter" which, in effect, operates like (physical) energy converters 150 and 155 between their respective energy delivery networks 110 and 120.

Absorption chiller 210 can convert an energy form (e.g., natural gas, electricity, and/or the like) into cool air and heat. In some cases, absorption chiller 210 can convert first form of energy into cool air and heat. In some cases, absorption chiller 210 can convert second energy form into cool air and heat. Geosolar heat pump 220 can convert an energy form (e.g. natural gas, electricity, and/or the like) into cool air and heat. In some cases, geosolar heat pump 220 can convert first energy form into cool air and heat. In some cases, geosolar heat pump 220 can convert second energy form into cool air and heat. Boiler 230 can convert an energy form into hot water. In some cases, boiler 230 can convert first energy form into hot water. In some cases, boiler 230 can convert second energy form into hot water.

In operation, controller 140 can communicate with first generator 160, second storage #?, and/or second consumer 175, such as absorption chiller 210, geosolar heat pump 220, and boiler 230 over communications network 130. As explained above, controller 140 can receive, for example, real time measurements from absorption chiller 210, geosolar heat pump 220, boiler 230, first consumer 170, first energy converter 150, second energy converter 155, and/or the like. And controller 140 can receive operating targets and/or constraints from operators of the energy delivery networks. Controller 140 can utilize the measurements received from the various components of the energy delivery networks and their operating environments to determine operational setpoints for the integrated energy delivery network and its various components.

As an example, controller 140 can receive real time measurements from first energy converter 150, second energy converter 155, first consumer 170, absorption chiller 210, boiler 230, and geosolar heat pump 220. Using the received measurements and operating targets and/or constraints received from operators of the energy delivery networks, controller 140 can determine operational setpoints for first energy converter 150, second energy converter 155, first consumer 170, absorption chiller 210, boiler 230, geosolar heat pump 220, and/or the like. For example, an operating target can include a goal of cooling first consumer 170. Controller 140 can determine an operational setpoint for geosolar heat pump 220 such that heat energy can be transferred to ground source 226 and cool air can be provided to first consumer 170.

Figure 3:
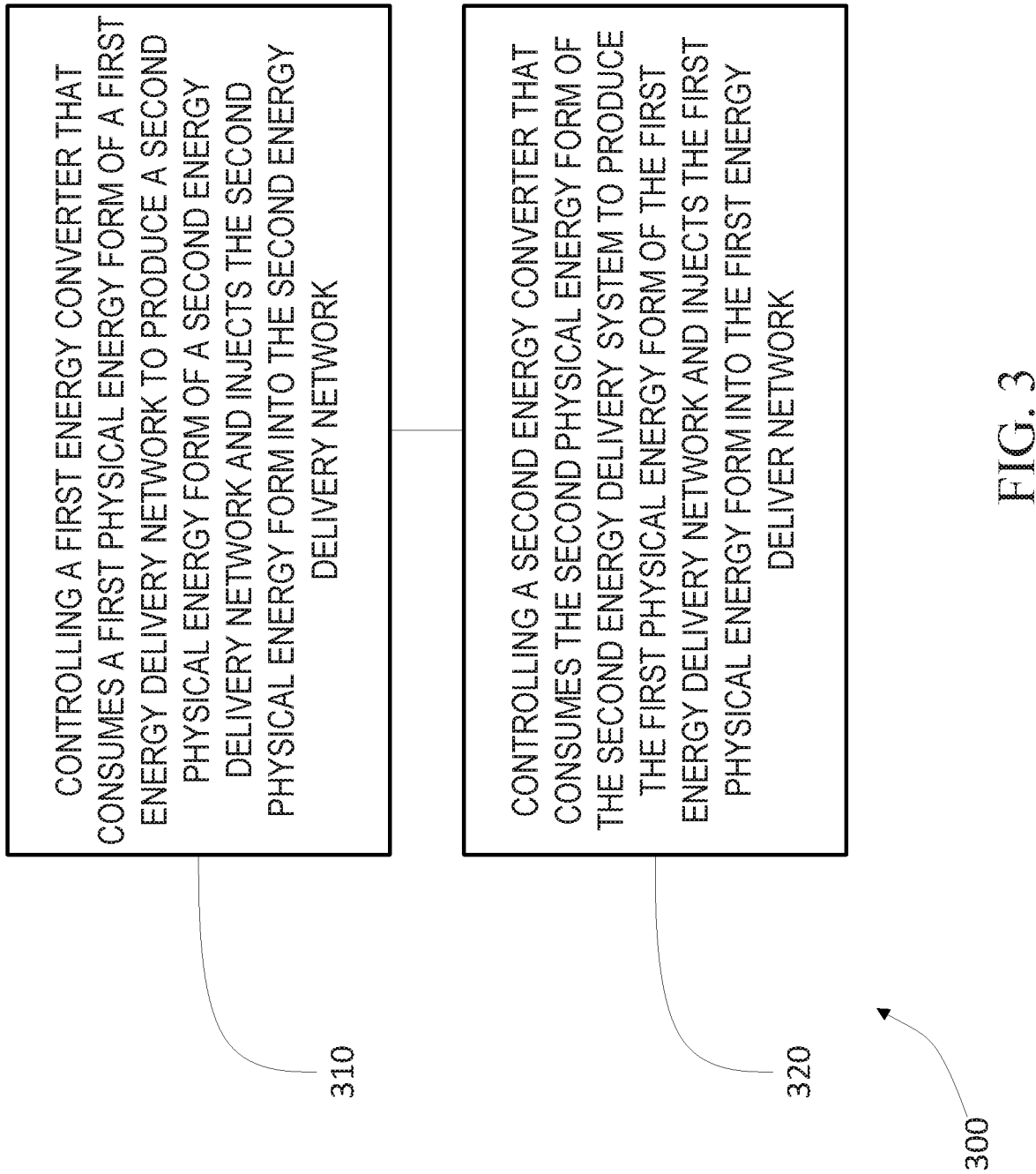
FIG. 3 is a process flow diagram illustrating an example process for moving energy between different energy delivery networks.

FIG. 3 is a process flow diagram 300 of an example process of moving energy between different energy delivery networks. By controlling a first energy converter and a second energy converter to move energy between a first energy delivery network and a second energy delivery network, operation of each individual energy delivery network can be improved and more efficient energy delivery can be realized.

At step 310, first energy converter 150 can be controlled. First energy converter 150 can consume a first energy form of first energy delivery network 110. First energy converter 150 can use the consumed first energy form to produce a second energy form of second energy delivery network 120. First energy converter 150 can inject the second energy form into second energy delivery network 120.

FIG. 4 Illustrates moving energy between first energy delivery network 110 and third energy delivery network 111 of the same type that are possibly geographically separated but can be coupled via second energy delivery network 120 of a different type. Controller 140 can control the energy converters 150 and 155 coupling first energy delivery network 110 to second energy delivery network 120. Controller 140 can control the energy converters 152 and 157 coupling third energy delivery network 111 to second energy delivery network 120. By virtue of second energy delivery network 120 being a different type that includes intrinsic storage, energy can be moved between energy delivery networks 110 and 111 via energy delivery network 120 without directly coupling them but with using the storage of energy delivery network 120 to stabilize both.

At step 320, second energy converter 155 can be controlled. Second energy converter 155 can consume the second form of second energy delivery network 120. Second energy converter 155 can use the consumed second energy form to produce first energy form of first energy delivery network 110. Second energy converter 155 can inject first energy form into first energy delivery network 110.

Several additional examples of the disclosed technology are enumerated below.

1. A method for controlling energy delivery networks that deliver forms of energy, comprising the steps of:
   (a) controlling first energy converter that: (i) consumes first energy form delivered by first bulk energy delivery network, (ii) produces second energy form therefrom for second bulk energy delivery network, and (iii) injects or adds produced second energy form into second bulk energy delivery network; and
   (b) controlling second energy converter that (i) consumes produced second energy form from second bulk energy delivery system, (ii) produces said first energy form therefrom, and (iii) injects or adds produced first energy form into another energy delivery network suitable for produced first energy form; and
   (c) coordinating said controlling of first energy converter and said controlling of second energy converter.

2. The method of example 1, wherein first bulk energy delivery network is not directly coupled to said another energy delivery network.

3. The method of any one of examples 1-2, wherein said another energy delivery network is said first energy delivery network.

4. The method of any one of examples 1-3, wherein, said coordinating addresses: (i) oversupply of one delivery network by storing excess energy in the other energy delivery network, and (ii) undersupply of one delivery network by extracting and using energy stored in the other energy delivery network.

5. The method of any one of examples 1-4, wherein first energy delivery network has no intrinsic storage and second energy delivery network has intrinsic storage, where intrinsic storage of delivery network in respect of an energy form is its inherent capability to store such energy form within its network infrastructure or the medium of energy transfer itself.

6. The method of any one of examples 1-5, further comprising:
   a) receiving, by a controller, data characterizing first energy delivery network operational state and energy delivery network first operational target;
   b) determining a deviation between first energy delivery network operational state and first energy delivery network operational target;
   c) using said deviation and first energy delivery network operational target, computing first energy delivery network operational setpoint and a second energy delivery network operational setpoint; and
   d) controlling (using first energy delivery network operational setpoint) the production of a portion of first energy form and (using second energy delivery network operational setpoint) the production of a portion of second energy form different from first energy form, first energy form portion generated by said first energy converter and second energy form portion produced by second energy converter different from first energy converter;
   wherein first energy converter is controlled by said controller to provide first energy form portion to first energy delivery network, and second energy converter is controlled by said controller to provide second energy form portion to second energy delivery network different from first energy delivery network.

7. The method of any one of examples 1-6, wherein an energy delivery network operational setpoint is the operational setpoint of a component thereof including one of (energy converter, storage, energy buffer, load local generator).

8. The method of any one of examples 1-7, wherein the computing further comprises:
   a) determining a program for first operational setpoint and second operational setpoint, the program including at least one constraint; and
   b) determining a feasible solution of the program;
   wherein at least one constraint of the program includes first energy delivery network operational target and first energy delivery network operational state;
   wherein the program includes one of (linear program, integer program, mixed integer linear program, quadratic program, neural network program, dynamic program, analytic program); and wherein the feasible solution includes first operational setpoint and second operational setpoint.

9. The method of any one of examples 1-8, further comprising:

receiving, by the controller, data characterizing a measurement from a local generator, the measurement including an instantaneous power output level; and wherein said one constraint of the program includes the instantaneous power output level.

10. The method of any one of examples 1-9, further comprising: receiving, by the controller, data characterizing a measurement from a local storage, the measurement including its instantaneous energy storage level; wherein said one constraint of the program includes said instantaneous energy storage level.

11. The method of any one of examples 1-10, further comprising: receiving, by the controller, data characterizing a measurement from a local consumer, the measurement including its instantaneous input power level of a load;

wherein said one constraint of the program includes said instantaneous input power level of the load.

12. The method of any one of examples 1-11, wherein first energy delivery network operational setpoint and second energy delivery network operational setpoint are computed by the controller based on measurements, targets, and/or constraints of, as applicable, one of (first energy delivery network, second energy delivery network, controllable devices).

13. The method of any one of examples 1-12, wherein first operational setpoint and second operational setpoint are recomputed by the controller based on changes to measurements, targets, and/or constraints of, as applicable, one of (first energy delivery network, second energy delivery network, controllable devices).

14. The method of any one of examples 1-13, wherein first operational setpoint and second operational setpoint are computed based on measurements, targets, and/or constraints communicated to the controller from one or more external source.

15. The method of any one of examples 1-14, wherein the controller has a sensor and wherein first energy delivery network operational setpoint and second energy delivery network operational setpoint are computed by controller based on measurements, targets, and/or constraints measured by said sensor.

16. The method of any one of examples 1-15, wherein first operational setpoint and second operational setpoint include a tradeoff between constraint and cost of operating controllable devices.

17. The method of any one of examples 1-16, wherein first energy delivery network operational setpoint includes a weight, and second energy delivery network operational setpoint includes a weight; and adaptively adjusting first energy delivery network operational setpoint weight and second energy delivery network operational setpoint weight, in response to a change in first energy delivery network operational state or second energy delivery network operational state.

18. The method of any one of examples 1-17, wherein the adaptive adjusting is performed by a computer according to instructions received from a remote source.

19. The method of any one of examples 1-18, wherein first energy form is stored in first energy buffer connected to first energy delivery network before being injected or added to second energy delivery network.

20. The method of any one of examples 1-19, wherein second energy form is stored in second energy buffer connected to second energy delivery network before being injected or added to first energy delivery network.

21. The method of any one of examples 1-20, wherein first energy form is consumed in advance of consumption by first consumer in second energy delivery network; and first net energy is delivered to second energy delivery network by reducing consumption in second energy delivery network.

22. The method of any one of examples 1-21, wherein first energy delivery network operational state includes instantaneous consumption and production of first energy form across first energy delivery network.

23. The method of any one of examples 1-22, wherein first energy delivery network operational target includes reducing transmission loss, increasing total energy delivery capacity, decreasing total operation cost, decreasing cost of a marginal unit of energy, increasing resilience to variability, reducing mechanical wear-and-tear on substation and generation equipment, and/or minimizing fuel cost.

24. The method of any one of examples 1-23, wherein first energy form is electrical energy.

25. The method of any one of examples 1-24, wherein second energy form includes one of (fluid carrier with intrinsic storage, natural gas, hydrogen).

26. The method of any one of examples 1-25, wherein first energy delivery network is an electrical grid.

27. The method of any one of examples 1-26, wherein second energy delivery network includes a natural gas pipeline 28. The method of any one of examples 1-27, wherein first energy converter is a combined heat and power unit.

29. The method of any one of examples 1-28, wherein first energy converter is a gas turbine.

30. The method of any one of examples 1-29, wherein first energy converter is a hydrolyzer.

31. The method of any one of examples 1-30, wherein second energy delivery network is a river system with (upstream) first hydroelectric dam with reservoir in controllable, fluid or fluvial communication with (downstream) second hydroelectric dam with reservoir, and first energy converter performs the actions of "pumped hydro" from downstream dam reservoir to upstream dam reservoir.

32. The method of any one of examples 1-31, wherein first energy converter performs the steps of "pumped hydro" between the waters downstream of first dam reservoir, by controlling the flow of water therebetween, while the energy demands downstream are met.

33. The method of any one of examples 1-32, wherein first energy converter performs the steps of curtailing or reducing water flow from upstream dam reservoir to downstream dam reservoir while the energy demands downstream are met.

34. The method of any one of examples 1-33, wherein an energy consumer is located intermediate first energy delivery network and second energy delivery network, and controls one or more of (local generator, local storage, local load) to perform virtual energy conversion between first energy deliver network and second energy delivery network.

35. A method comprising:

controlling first energy converter that consumes first energy form of first energy delivery network to produce second energy form of second energy delivery network and stores second energy form in first energy buffer; and controlling second energy converter that consumes second energy form of second energy delivery system to produce first energy form of first energy delivery network and stores first energy form in second energy buffer.

36. A method of adding storage capacity for bulk energy, for use by an electric grid utility, by coordinating a plurality of conventional gas utilities components into a bulk energy integrated network in accordance with any one of examples 1-35.

37. A method of adding storage capacity for bulk energy, for use by an electric grid utility, comprising:
coordinating a plurality of conventional gas utilities components into an integrated bulk energy delivery network;
creating a temporal delay by storing excess electric energy in said coordinated plurality; and
returning excess electrical energy to the electric grid utility.

38. A system comprising at least one processor and memory storing instructions which, when executed by the at least one processor, cause the at least one processor to perform operations comprising the method of any one of examples 1-37.

39. An apparatus for controlling energy delivery networks that deliver forms of energy, comprising:
(a) controller that controls first energy converter (i) to consume first energy form delivered by first bulk energy delivery network, (ii) to produce second energy form therefrom for second bulk energy delivery network, and (iii) to inject or add produced second energy form into second bulk energy delivery network; and
(b) controller that controls second energy converter (i) to consume produced second energy form from second bulk energy delivery system, (ii) to produce said first energy form therefrom, and (iii) to inject or add produced first energy form into another energy delivery network suitable for produced first energy form; and
(c) coordinator that coordinates first energy converter controller and second energy converter controller.

40. The apparatus of example 39, wherein first bulk energy delivery network has no direct energy communication with said another energy delivery network.

41. The apparatus of any one of examples 39-40, wherein said another energy delivery network is said first energy delivery network.

42. The apparatus of any one of examples 39-41, wherein, said coordinator addresses: (i) an oversupply of one delivery network by storing excess energy in the other energy delivery network, and (ii) undersupply of one delivery network by extracting and using energy stored in the other energy delivery network.

43. The apparatus of any one of examples 39-42, wherein first energy delivery network has no intrinsic storage and second energy delivery network has intrinsic storage, where intrinsic storage of delivery network in respect of an energy form is its inherent capability to store such energy form within its network infrastructure or the medium of energy transfer itself.

44. The apparatus of any one of examples 39-43, further comprising:
a) receiving, by a controller, data characterizing first energy delivery network operational state and energy delivery network first operational target;
b) determining a deviation between first energy delivery network operational state and first energy delivery network operational target;
c) using said deviation and first energy delivery network operational target, computing first energy delivery network operational setpoint and a second energy delivery network operational setpoint; and
d) controller for (using first energy delivery network operational setpoint) the production of a portion of first energy form and (using second energy delivery network operational setpoint) the production of a portion of second energy form different from first energy form, first energy form portion generated by said first energy converter and second energy form portion produced by second energy converter different from first energy converter;
wherein first energy converter is controlled by said controller to provide first energy form portion to first energy delivery network, and second energy converter is controlled by said controller to provide second energy form portion to second energy delivery network different from first energy delivery network.

45. The apparatus of any one of examples 39-44, wherein an energy delivery network operational setpoint is the operational setpoint of a component thereof including one of (energy converter, storage, energy buffer, load local generator).

46. The apparatus of any one of examples 39-45, wherein the computing further comprises:
a) determining a program for first operational setpoint and second operational setpoint, the program including at least one constraint; and
b) determining a feasible solution of the program;
wherein at least one constraint of the program includes first energy delivery network operational target and first energy delivery network operational state; wherein the program includes one of (linear program, integer program, mixed integer linear program, quadratic program, neural network program, dynamic program, analytic program); and
wherein the feasible solution includes first operational setpoint and second operational setpoint.

47. The apparatus of any one of examples 39-46, further comprising: receiving, by the controller, data characterizing a measurement from a local generator, the measurement including an instantaneous power output level; wherein said one constraint of the program includes the instantaneous power output level.

48. The apparatus of any one of examples 39-47, further comprising: receiving, by the controller, data characterizing a measurement from a local storage, the measurement including its instantaneous energy storage level; wherein said one constraint of the program includes said instantaneous energy storage level.

49. The apparatus of any one of examples 39-48, further comprising: receiving, by the controller, data characterizing a measurement from a local consumer, the measurement including its instantaneous input power level of a load;
wherein said one constraint of the program includes said instantaneous input power level of the load.

50. The apparatus of any one of examples 39-49, wherein first energy delivery network operational setpoint and second energy delivery network operational setpoint are computed by the controller based on measurements, targets, and/or constraints of, as applicable, one of (first energy delivery network, second energy delivery network, controllable devices).

51. The apparatus of any one of examples 39-50, wherein first operational setpoint and second operational setpoint are recomputed by the controller based on changes to measurements, targets, and/or constraints of, as applicable, one of (first energy delivery network, second energy delivery network, controllable devices).

52. The apparatus of any one of examples 39-51, wherein first operational setpoint and second operational setpoint are computed based on measurements, targets, and/or constraints communicated to the controller from one or more external source.

53. The apparatus of any one of examples 39-52, wherein the controller has a sensor and wherein first energy delivery network operational setpoint and second energy delivery network operational setpoint are computed by controller based on measurements, targets, and/or constraints measured by said sensor.

54. The apparatus of any one of examples 39-53, wherein first operational setpoint and second operational setpoint include a tradeoff between constraint and cost of operating controllable devices.

55. The apparatus of any one of examples 39-54, wherein first energy delivery network operational setpoint includes a weight, and second energy delivery network operational setpoint includes a weight; and
further comprising an adjuster that adaptively adjusts first energy delivery network operational setpoint weight and second energy delivery network operational setpoint weight, in response to a change in first energy delivery network operational state or second energy delivery network operational state.

56. The apparatus of any one of examples 39-55, wherein the adjuster is controlled by a computer according to instructions received from a remote source.

57. The apparatus of any one of examples 39-56, wherein first energy form is stored in first energy buffer connected to first energy delivery network before being injected or added to second energy delivery network.

58. The apparatus of any one of examples 39-57, wherein second energy form is stored in second energy buffer connected to second energy delivery network before being injected or added to first energy delivery network.

59. The apparatus of any one of examples 39-58, wherein first energy form is consumed in advance of consumption by first consumer in second energy delivery network; and
first net energy is delivered to second energy delivery network by reducing consumption in second energy delivery network.

60. The apparatus of any one of examples 39-59, wherein first energy delivery network operational state includes instantaneous consumption and production of first energy form across first energy delivery network.

61. The apparatus of any one of examples 39-60, wherein first energy delivery network operational target includes reducing transmission loss, increasing total energy delivery capacity, decreasing total operation cost, decreasing cost of a marginal unit of energy, increasing resilience to variability, reducing mechanical wear-and-tear on substation and generation equipment, and/or minimizing fuel cost.

62. The apparatus of any one of examples 39-61, wherein first energy form is electrical energy.

63. The apparatus of any one of examples 39-62, wherein second energy form includes one of (fluid carrier with intrinsic storage, natural gas, hydrogen).

64. The apparatus of any one of examples 39-63, wherein first energy delivery network is an electrical grid.

65. The apparatus of any one of examples 39-64, wherein second energy delivery network includes a natural gas pipeline 66. The apparatus of any one of examples 39-65, wherein first energy converter is a combined heat and power unit.

67. The apparatus of any one of examples 39-66, wherein first energy converter is a gas turbine.

68. The apparatus of any one of examples 39-67, wherein second energy converter is a hydrolyzer.

69. The apparatus of any one of examples 39-68, wherein second energy delivery network is a river system with (upstream) first hydroelectric dam with reservoir in controllable, fluid or fluvial communication with (downstream) second hydroelectric dam with reservoir, and first energy converter performs the actions of "pumped hydro" from downstream dam reservoir to upstream dam reservoir.

70. The apparatus of any one of examples 39-69, wherein first energy converter performs the steps of "pumped hydro" between the waters downstream of first dam reservoir, by controlling the flow of water therebetween, while the energy demands downstream are met.

71. The apparatus of any one of examples 39-70, wherein first energy converter performs the steps of curtailing or reducing water flow from upstream dam reservoir to downstream dam reservoir while the energy demands downstream are met.

72. The apparatus of any one of examples 39-71, wherein an energy consumer is located intermediate first energy delivery network and second energy delivery network, and controls one or more of (local generator, local storage, local load) to perform virtual energy conversion between first energy deliver network and second energy delivery network.

73. An apparatus comprising:
controller for first energy converter that consumes first energy form of first energy delivery network to produce second energy form of second energy delivery network and stores second energy form in first energy buffer; and
controller for second energy converter that consumes second energy form of second energy delivery system to produce first energy form of first energy delivery network and stores first energy form in second energy buffer.

74. An apparatus for adding storage capacity for bulk energy, for use by an electric grid utility, that coordinates a plurality of conventional gas utilities components into a bulk energy integrated network in accordance with any one of examples 39-73.

75. An apparatus for adding storage capacity for bulk energy, for use by an electric grid utility, comprising:
means for coordinating a plurality of conventional gas utilities components into an integrated bulk energy delivery network;
means for delaying that creates a temporal delay by storing excess electric energy in said coordinated plurality; and
means to return excess electrical energy to the electric grid utility.

76. A system comprising at least one processor and memory storing instructions which, when executed by the at least one processor, cause the at least one processor to perform operations comprising the apparatus of any one of examples 39-75.

77. Apparatus, systems, techniques, and/or articles described and/or illustrated herein.

Although a few variations have been described in detail above, other modifications or additions are possible. For example, excess of energy in an energy delivery network can be detected, the over-supply can be consumed to perform work that can move the excess energy into another energy delivery network, either directly or using an energy buffer. A sensing, communications and control computer can sense, communicate, and/or control one or more energy converters that can use the energy form of first energy delivery network to produce the energy form of a second energy delivery network, and/or an intermediate form. The sensing, communications and control computer can be connected to first energy delivery network and can either directly sense energy over-supply conditions, and/or indirectly sense them by being informed of energy over-supply conditions through a communications interface. In an energy over-supply condition, the sensing, communications and control computer can control the energy converter(s) to consume all and/or a portion of the excess of energy in the first energy deliver network and produce energy that can be injected into the second energy delivery network, and/or into an energy buffer that can be injected into the second energy delivery network.

For example, an energy under-supply condition in an energy delivery network can be detected and responded to, all and/or a portion of the shortfall of energy can be generated by performing work that can draw energy from a second energy delivery network, either directly and/or using an energy buffer. A sensing, communications and control computer can sense, communicate, and control one or more energy converters that can use the energy form of the second energy delivery network to produce the energy form of first energy delivery network. The sensing, communications and control computer can be connected to first energy delivery network and can be capable of either directly sensing energy under-supply conditions, and/or indirectly sensing energy under-supply conditions by being informed of energy under-supply conditions through a communications interface. In an energy under-supply condition, the sensing, communications and control computer can control the energy converter(s) to produce enough energy to meet all and/or a portion of the under-supply of energy in first energy delivery network using energy from the second energy delivery network.

For example, an excess of energy in a first energy delivery network can be detected and/or responded to, all and/or a portion of the over-supply can be consumed to perform work that can consume some of the excess energy directly and/or move some of the excess energy into a second energy delivery network, either directly and/or using an energy buffer. A sensing, communications, and control computer can control an energy consumer and/or an energy converter that can use the energy form of first energy delivery network to produce the energy form of the second energy delivery network and/or an intermediate form. The sensing, communications and control computer can be connected to first energy delivery network and can be capable of either directly sensing energy over-supply conditions, and/or indirectly sensing energy over-supply conditions by being informed of energy over-supply conditions through a communications interface. In an energy over-supply condition, the sensing, communications and control computer can control the energy consumer to consume all and/or a portion of the excess energy, control the energy consumer to meet more of its energy needs from first energy delivery network rather than the second energy delivery network, and/or control the energy converter to consume all and/or a portion of the excess of energy in first energy delivery network to produce energy that can be injected into the second energy deliver network, and/or into an energy storage buffer which can then be injected into the second energy delivery network.

For example, an energy under-supply condition can be detected and/or responded to in an energy delivery network, consumption of loads connected to the energy delivery network can be reduced, and/or all and/or a portion of the shortfall of energy can be generated by performing work that can draw energy from a second energy delivery network, either directly and/or using an energy buffer. A sensing, communications, and control computer can control an energy consumer and/or an energy converter that can use the energy form of a second energy delivery network to produce the energy form of first energy delivery network. The sensing, communications and control computer can be connected to first energy delivery network and can be capable of directly and/or indirectly sensing energy under-supply conditions by being informed of energy under-supply conditions through a communications interface. In an energy under-supply condition, the sensing, communications and control computer can control the energy consumer to reduce its energy consumption from first energy delivery network, control the energy consumer to meet more of its energy needs from the second energy delivery network rather than first energy delivery network, and/or can control the energy converter to produce enough energy to meet all and/or a portion of the under-supply of energy in first energy delivery network using energy from the second energy delivery network.

For example, an excess of energy in an energy delivery network can be detected and/or responded to, all and/or a portion of the over-supply can be consumed to perform work that can consume some of the excess energy directly and/or move some of the excess energy into another energy delivery network, directly and/or using an energy buffer. A sensing, communications, and control computer can control an energy consumer and/or an energy generator that can be connected only to first energy delivery network, and energy converter can use the energy form of first energy delivery network to produce the energy form of another energy delivery network, and/or an intermediate form. The sensing, communications and control computer can be connected to first energy delivery network and can be capable directly and/or indirectly sensing local energy over-supply conditions from the local generator, and can be capable of being informed of non-local energy over-supply conditions through a communications interface. In a non-local energy over-supply condition, the sensing, communications and control computer can control the energy consumer to consume all and/or a portion of the excess energy, can control the local generator to reduce its output so that the energy consumer draws more energy from the energy delivery network, and can control the energy converter to consume all and/or a portion of the excess of energy in first energy delivery network to produce energy that can be injected into another energy delivery network, and/or into an energy storage buffer which can be injected into another energy delivery network.

For examples, energy can be temporarily stored in an energy buffer connected to first energy delivery network before being moved to the second energy delivery network. Energy can be temporarily stored in an energy buffer connected to the second energy delivery network before being moved to the consumers on first energy delivery network. Energy can be consumed in advance of when it would otherwise normally have been consumed using energy from first energy delivery network and net energy can be delivered to the second energy delivery network by reducing consumption on the second energy delivery network. Energy can be consumed in advance of when it would otherwise normally have been consumed using energy from the second energy delivery network and net energy can delivered to first energy delivery network by reducing consumption on first energy delivery network.

The operational setpoints for controllable devices can be computed by controller 140 based on measurements, targets, and/or constraints of the energy delivery networks and/or controllable devices (e.g., components of the energy delivery networks). The operational setpoints for controllable devices can be recomputed based on changes to the measurements, targets, and/or constraints of the energy delivery networks and/or controllable devices, even if those values are changing at high frequency. The operational setpoints for controllable devices can be computed based on measurements, targets, and constraints communicated to controller 140 from external sources (such as the control system of electric grid utility, gas utility, consumer and the like). The operational setpoints for controllable devices can be computed based on measurements, targets, and/or constraints measured directly by controller 140 from attached sensors (not shown for economy of illustration).

The operational setpoints for controllable devices can be computed based on measurements, targets, and/or constraints computed by controller 140 based on a mathematical model. The operational setpoints for controllable devices can include an optimal tradeoff between the constraints and/or costs of operating each controllable device in its immediate environment. The weights used for determining an optimal tradeoff can be statically set in controller 140. The weights used for determining an optimal tradeoff can be communicated to controller 140 over a communications network. The weights used for determining an optimal tradeoff can be measured directly by controller 140. The weights used for determining an optimal tradeoff can be computed by controller 140 based on a mathematical model The subject matter described herein provides many technical advantages. For example, one energy delivery network can be used to improve the performance of another energy delivery network by controlling a device (e.g., first energy converter) that can consume the energy form of one of a first energy delivery network to produce the energy form of a second energy delivery network and can injects the produced energy into the second energy delivery network. And a second device (e.g., second energy converter) can be controlled that can consume the energy form of the second energy delivery network to produce the energy form of first energy delivery network and can inject the produced energy into first energy delivery network.

The performance of first energy delivery network can be improved for example, by increasing total energy delivery capacity, decreasing total operational cost, decreasing cost of a marginal unit of energy, increasing resilience to variability, storing produced energy in an intermediate storage buffer (e.g., hydrogen) before transfer between energy delivery networks, reducing consumption by consuming energy in advance of desired consumption and delivering net energy, computing operational setpoints optimizing performance of the integrated energy delivery network in real time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communications network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method for controlling energy delivery networks that deliver forms of energy, comprising the steps of:
   controlling a hydrolyzer that: consumes electricity delivered by an electrical grid, produces hydrogen therefrom, and injects the produced hydrogen into a natural gas pipeline network;
   controlling a gas-to-electricity energy converter that: consumes any one of (i) natural gas, or (ii) hydrogen and natural gas from the natural gas pipeline network, produces electricity therefrom, and provides the produced electricity into the electrical grid or another electrical grid; and
   coordinating the controlling of the hydrolyzer and the controlling of the gas-to-electricity energy converter, the coordinating comprising:
      receiving data characterizing an operational state and operational target, wherein the operational target comprises causing a net shift of energy based on seasons;
      determining a deviation between the operational state and the operational target;
      computing a first operational setpoint of the electrical grid and a second operational setpoint of the natural gas pipeline network based on the deviation and the operational target; and
      controlling the operation of the hydrolyzer and the gas-to-electricity energy converter based on the first operational setpoint and the second operational setpoint, comprising:
         controlling one or both of the hydrolyzer and the gas-to-electricity energy converter to cause a net shift of electricity to gas during a first season, and
         controlling one or both of the hydrolyzer and the gas-to-electricity energy converter to cause a net shift of gas to electricity during a second season.

2. The method of claim 1, wherein the electrical grid is not directly coupled to the other electrical grid.

3. The method of claim 1, wherein the coordinating addresses:
   oversupply of electricity from one or both of the electrical grid and the other electrical grid by controlling the hydrolyzer to produce additional hydrogen using the oversupply of electricity and inject the additional hydrogen to the natural gas pipeline network; and
   undersupply of electricity from one or both of the electrical grid and the other electrical grid by controlling the gas-to-electricity energy converter to produce electricity using gas from the natural gas pipeline network and providing the electricity to one or both of the electrical grid and the other electrical grid.

4. The method of claim 1, wherein the electrical grid has no intrinsic storage and the natural gas pipeline network has intrinsic storage, wherein the intrinsic storage of a bulk energy delivery network in respect of an energy form is its inherent capability to store such energy form within its network infrastructure or the medium of energy transfer itself.

5. The method of claim 1, wherein the coordinating addresses:
   oversupply of gas from the natural gas pipeline network by controlling the gas-to-electricity energy converter to produce additional electricity using the oversupply of gas and provide the additional electricity to one or both of the electrical grid and the other electrical grid; and
   undersupply of gas from the natural gas pipeline network by controlling the hydrolyzer to produce hydrogen using electricity from one or both of the electrical grid and the other electrical grid and injecting the hydrogen to the natural gas pipeline network.

6. The method of claim 1, further comprising supplying oxygen gas to a consumer, wherein the hydrolyzer produces the oxygen gas as a byproduct of consuming electricity and producing hydrogen.

7. The method of claim 1, wherein computing the first operational setpoint and the second operational setpoint comprises:
   determining a program for the first operational setpoint and the second operational setpoint, the program including one or more constraints; and
   determining a feasible solution of the program, wherein:
      at least one of the one or more constraints includes the operational target and the operational state, and
      the feasible solution includes the first operational setpoint and the second operational setpoint.

8. The method of claim 7, wherein the program includes any one of: (i) a linear program, (ii) an integer program, (iii) a mixed integer linear program, (iv) a quadratic program, (v) a neural network program, (vi) a dynamic program, (vii) an analytic program, or (viii) any combination of (i)-(vii).

9. The method of claim 1, wherein the first season is summer and the second season is winter.

10. A system for controlling energy delivery networks that deliver forms of energy, the system comprising:
   a hydrolyzer operable to:
      consume electricity delivered by a first bulk energy delivery network comprising an electrical grid;
      produce hydrogen using the consumed electricity; and
      inject the produced hydrogen into a second bulk energy delivery network comprising a natural gas pipeline;

a gas-to-electricity energy converter operable to:
  consume any one of (i) natural gas, or (ii) hydrogen and natural gas from the second bulk energy delivery network;
  produce electricity using the consumed gas; and
  provide the produced electricity into the first bulk energy delivery network or a third bulk energy delivery network suitable for the electricity; and
a controller operable to coordinate the transfer of energy between the first bulk energy delivery network and the second bulk energy delivery network by controlling one or both of the hydrolyzer and the gas-to-electricity energy converter, comprising to:
  receive data characterizing an operational state and operational target, wherein the operational target comprises causing a net shift of energy based on seasons;
  determine a deviation between the operational state and the operational target; compute a first operational setpoint of the first bulk energy delivery network and a second operational setpoint of the second bulk energy delivery network based on the deviation and the operational target; and
  control the operation of the hydrolyzer and the gas-to-electricity energy converter based on the first operational setpoint and the second operational setpoint, comprising to:
    control one or both of the hydrolyzer and the gas-to-electricity energy converter to cause a net shift of electricity to gas during a first season, and
    control one or both of the hydrolyzer and the gas-to-electricity energy converter to cause a net shift of gas to electricity during a second season.

11. The system of claim 10, wherein the controller is further operable to:
  determine a second operational state of the second bulk energy delivery network;
  determine a second operational target of the second bulk energy delivery network; and
  control one or both of the hydrolyzer and the gas-to-electricity energy converter based on one or both of the second operational state and the second operational target.

12. The system of claim 11, wherein the second operational target comprises a transmission of energy across long geographical distances, wherein the controller controls the hydrolyzer to cause a transfer energy from the first bulk energy delivery network to the second bulk energy delivery network to meet the second operational target.

13. The system of claim 10, further comprising an energy buffer operable to store electricity delivered by one or both of the first bulk energy delivery network and the third bulk energy delivery network, wherein the hydrolyzer is further operable to:
  consume electricity stored by the energy buffer;
  produce hydrogen using the electricity stored by the energy buffer; and
  provide the hydrogen produced using the electricity stored by the energy buffer into the second bulk energy delivery network.

14. The system of claim 10, further comprising an energy buffer operable to store gas delivered by the second bulk energy delivery network, wherein the gas-to-electricity energy converter is further operable to:
  consume gas stored by the energy buffer;
  produce electricity using the gas stored by the energy buffer; and
  provide the electricity produced using the gas stored by the energy buffer into one or both of the first bulk energy delivery network and the third bulk energy delivery network.

15. The system of claim 10, wherein to compute the first operational setpoint and the second operational setpoint comprises to:
  determine a program for the first operational setpoint and the second operational setpoint, the program including one or more constraints; and
  determine a feasible solution of the program, wherein:
    at least one of the one or more constraints includes the operational target and the operational state,
    the program includes any one of (i) a linear program, (ii) an integer program, (iii) a mixed integer linear program, (iv) a quadratic program, (v) a neural network program, (vi) a dynamic program, (vii) an analytic program, or (viii) any combination of (i)-(vii), and
    the feasible solution includes the first operational setpoint and the second operational setpoint.

16. The system of claim 10, wherein the first season is summer and the second season is winter.

17. A computer readable storage medium comprising instructions which, when executed by a processor, cause the processor to:
  control a hydrolyzer that: consumes electricity delivered by an electrical grid, produces hydrogen therefrom, and injects the produced gas into a natural gas pipeline network;
  control a gas-to-electricity energy converter that consumes any one of (i) natural gas, or (ii) hydrogen and natural gas from the natural gas pipeline network, produces electricity therefrom, and provides the produced electricity into the electrical grid or another electrical grid; and
  coordinate the controlling of the hydrolyzer and the controlling of the gas-to-electricity energy converter, comprising to:
    receive data characterizing an operational state and operational target, wherein the operational target comprises causing a net shift of energy based on seasons;
    determine a deviation between the operational state and the operational target;
    compute a first operational setpoint of the electrical grid and a second operational setpoint of the natural gas pipeline network based on the deviation and the operational target; and
    control the operation of the hydrolyzer and the gas-to-electricity energy converter based on the first operational setpoint and the second operational setpoint, comprising to:
      control one or both of the hydrolyzer and the gas-to-electricity energy converter to cause a net shift of electricity to gas during a first season, and
      control one or both of the hydrolyzer and the gas-to-electricity energy converter to cause a net shift of gas to electricity during a second season.

18. The computer readable storage medium of claim 17, wherein determining the first operational setpoint is based on:
  a measurement of the electrical grid;
  a target of the electrical grid;
  a constraint of the electrical grid; or
  a combination thereof.

19. The computer readable storage medium of claim 17, wherein determining the second operational setpoint is based on:
- a measurement of the natural gas pipeline network;
- a target of the natural gas pipeline network;
- a constraint of the natural gas pipeline network; or
- a combination thereof.

20. The computer readable storage medium of claim 17, wherein the first season is summer and the second season is winter.

* * * * *